(12) United States Patent
Xia et al.

(10) Patent No.: US 11,264,883 B2
(45) Date of Patent: Mar. 1, 2022

(54) SYSTEMS AND METHODS FOR CONTROLLING A LORENTZ-FORCE-BASED APPARATUS

(71) Applicant: Facebook, Inc., Menlo Park, CA (US)

(72) Inventors: Chiyun Xia, Agoura Hills, CA (US); Eric Booen, Thousand Oaks, CA (US); William Hamlin Farr, Dublin, CA (US); Alexandre Yin Khet Chong, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 17/021,781

(22) Filed: Sep. 15, 2020

(65) Prior Publication Data

US 2020/0409475 A1 Dec. 31, 2020

Related U.S. Application Data

(63) Continuation of application No. 16/138,263, filed on Sep. 21, 2018, now Pat. No. 10,824,245, which is a continuation-in-part of application No. 15/940,019, filed on Mar. 29, 2018, now Pat. No. 10,833,573.

(51) Int. Cl.
| | |
|---|---|
| *H02K 41/035* | (2006.01) |
| *H02K 41/03* | (2006.01) |
| *G06F 3/033* | (2013.01) |
| *G06F 3/01* | (2006.01) |

(52) U.S. Cl.
CPC ......... *H02K 41/0358* (2013.01); *G06F 3/016* (2013.01); *G06F 3/033* (2013.01); *H02K 41/031* (2013.01)

(58) Field of Classification Search
CPC .. H02K 41/0358; H02K 41/031; G06F 3/033; G06F 3/016; H01F 7/0236
See application file for complete search history.

(56) References Cited

U.S. PATENT DOCUMENTS

| | | | |
|---|---|---|---|
| 5,610,750 | A | 3/1997 | Popescu et al. |
| 6,664,666 | B2 | 12/2003 | Corcoran |
| 8,476,800 | B2 | 7/2013 | Lai et al. |
| 8,497,767 | B2 | 7/2013 | Hollis, Jr. |

(Continued)

OTHER PUBLICATIONS ip.com Search Results.*

(Continued)

*Primary Examiner* — Mohamad A Musleh
(74) *Attorney, Agent, or Firm* — FisherBroyles, LLP

(57) ABSTRACT

The disclosed system may include (1) a conductive coil, where at least a portion of the coil is oriented along a first direction and orthogonal to a second direction, (2) a magnetic field generation structure that generates a magnetic field through the coil along a third direction orthogonal to the first and second directions, (3) a force constant compensator that (a) receives a current command to alter a relative location of the coil and the field, and (b) adjusts the current command based on at least one physical characteristic of the system that affects a relationship between current in the coil and resulting force between the coil and the field along the second direction, and (4) a coil driver that generates, in response to the adjusted current command, a first current in the coil to generate a force between the coil and the field. Other embodiments are also disclosed.

20 Claims, 20 Drawing Sheets

(56) References Cited

U.S. PATENT DOCUMENTS

| 10,658,916 | B1 | 5/2020 | Xia et al. | |
|---|---|---|---|---|
| 2011/0050405 | A1* | 3/2011 | Hollis, Jr. | G06F 3/016 340/407.2 |

OTHER PUBLICATIONS

Alhorn, Dean C., "Advanced Technology for Isolating Payloads in Microgravity", NASA Marshall Space Flight Center accessed from https://ntrs.nasa.gov/archive/nasa/casi.ntrs.nasa.gov/20010000366.pdf, accessed on Mar. 28, 2018, 7 pages.

Green et al., "Payload Isolation for Microgravity Research", Controlled Dynamics Inc., Huntington Beach, CA, accessed at https://flightopportunities.nasa.gov/media/technology/78177 -s_poster_asgsr2013 .pdf, accessed on Feb. 28, 2018, 1 page.

Berkelman et al.,"Using Magnetic Levitation for Haptic Interaction", University of Hawaii at Manoa, USA, pp. 31-46.

Berkelman et al., "Actuation Model for Control of a Long Range Lorentz Force Magnetic Levitation Device", Proceedings of the IEEE International Conference on Intelligent Robots and Systems, Nov. 2010, 7 pages.

"Magic Wrist", Microdynamic Systems Laboratory, The Robotics Institute at Carnegie Mellon University, Jan. 7, 2005, 2 pages.

Berkelman, Peter, "Tool-Based Haptic Interaction with Dynamic Physical Simulations Using Lorentz Magnetic Levitation", Johns Hopkins University, Jan. 2000, pp. 1-21.

Salcudean et al., "6-DOF Desk-Top Voice-Coil Joystick", Department of Electrical and Computer Engineering, University of British Columbia, Vancouver, BC, V6T 1Z4, Canada, 1997, 7 pages.

Wong, Ngai Mun, "Implementation of a Force-Reflecting Telerobotic System with Magnetically Levitated Master and Wrist", Department of Electrical Engineering, University of British Columbia, Dec. 1992, 122 pages.

Tufail, Muhammad, "Haptic Teleoperation with Impedance Control Based on Learned Inverse Dynamics with Application in Homecare Robotics", University of British Columbia, Vancouver, Dec. 2015, 176 pages.

Xia et al., "Systems and Methods for Controlling a Lorentz-Force-Based Apparatus", U.S. Appl. No. 16/138,263, filed Sep. 21, 2018, 86 pages.

Notice of Allowance received for U.S. Appl. No. 16/138,358 dated Jan. 15, 2020, 23 pages.

Notice of Allowance received for U.S. Appl. No. 15/940,019 dated Jul. 6, 2020, 28 pages.

Booen et al., "Apparatuses, Systems, and Methods for Lorentz-Force-Based Movement", U.S. Appl. No. 17/010,258, filed Sep. 2, 2020, 68 pages.

Booen et al., "Apparatuses, Systems, and Methods for Lorentz-Force-Based Movement", U.S. Appl. No. 15/940,019, filed Mar. 29, 2018, 64 pages.

Notice of Allowance received for U.S. Appl. No. 16/138,263 dated Jun. 30, 2020, 24 pages.

IP.COM search results for U.S. Appl. No. 17/010,258, 1 page.

* cited by examiner

SYSTEMS AND METHODS FOR CONTROLLING A LORENTZ-FORCE-BASED APPARATUS

CROSS REFERENCE TO RELATED APPLICATIONS

This application is a continuation of U.S. application Ser. No. 16/138,263, filed 21 Sep. 2018, which is a continuation-in-part of U.S. application Ser. No. 15/940,019, filed 29 Mar. 2018. Each of these disclosures is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
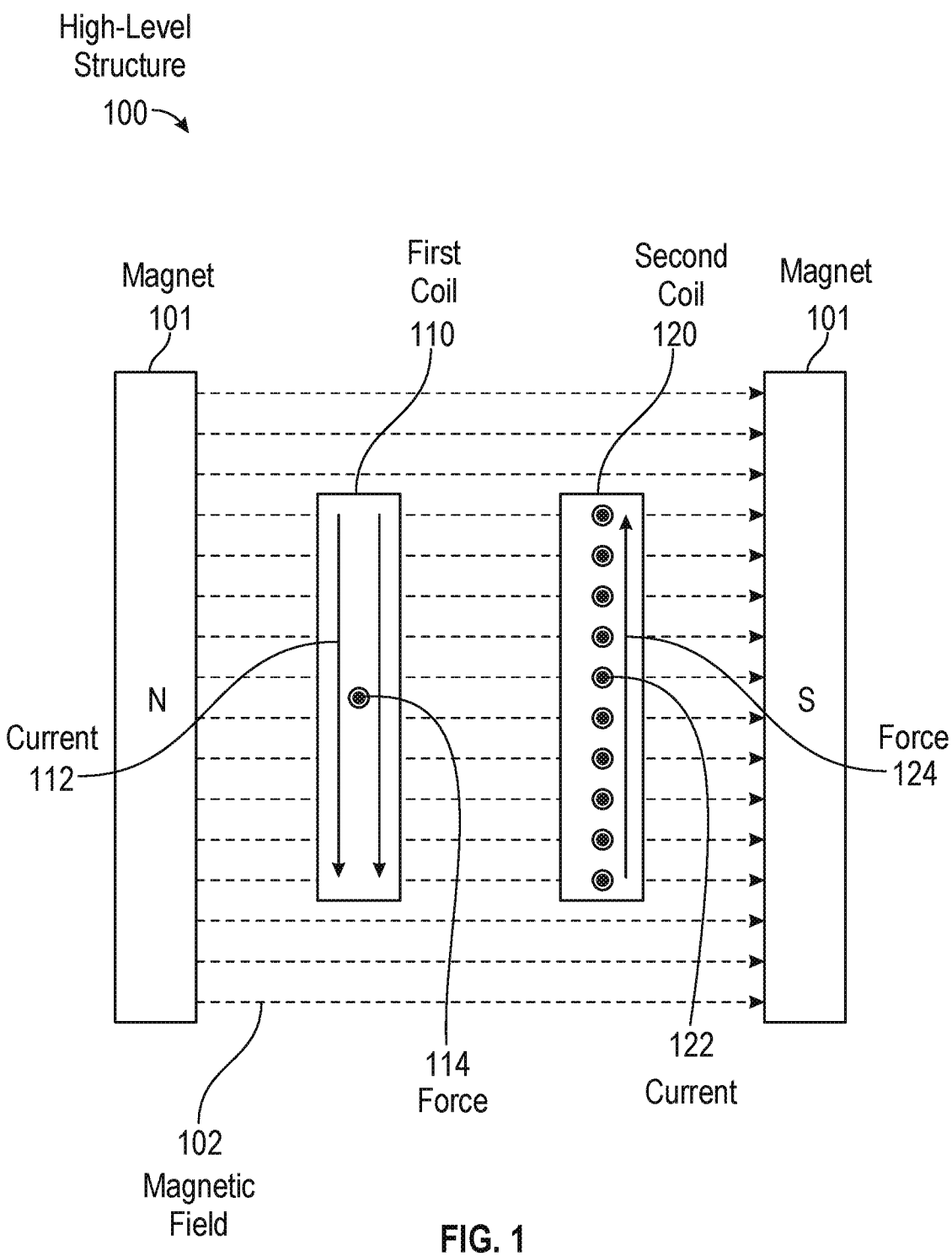
FIG. 1 is a graphical representation of an exemplary high-level structure for employing the Lorentz force for movement purposes.
Figure 2:
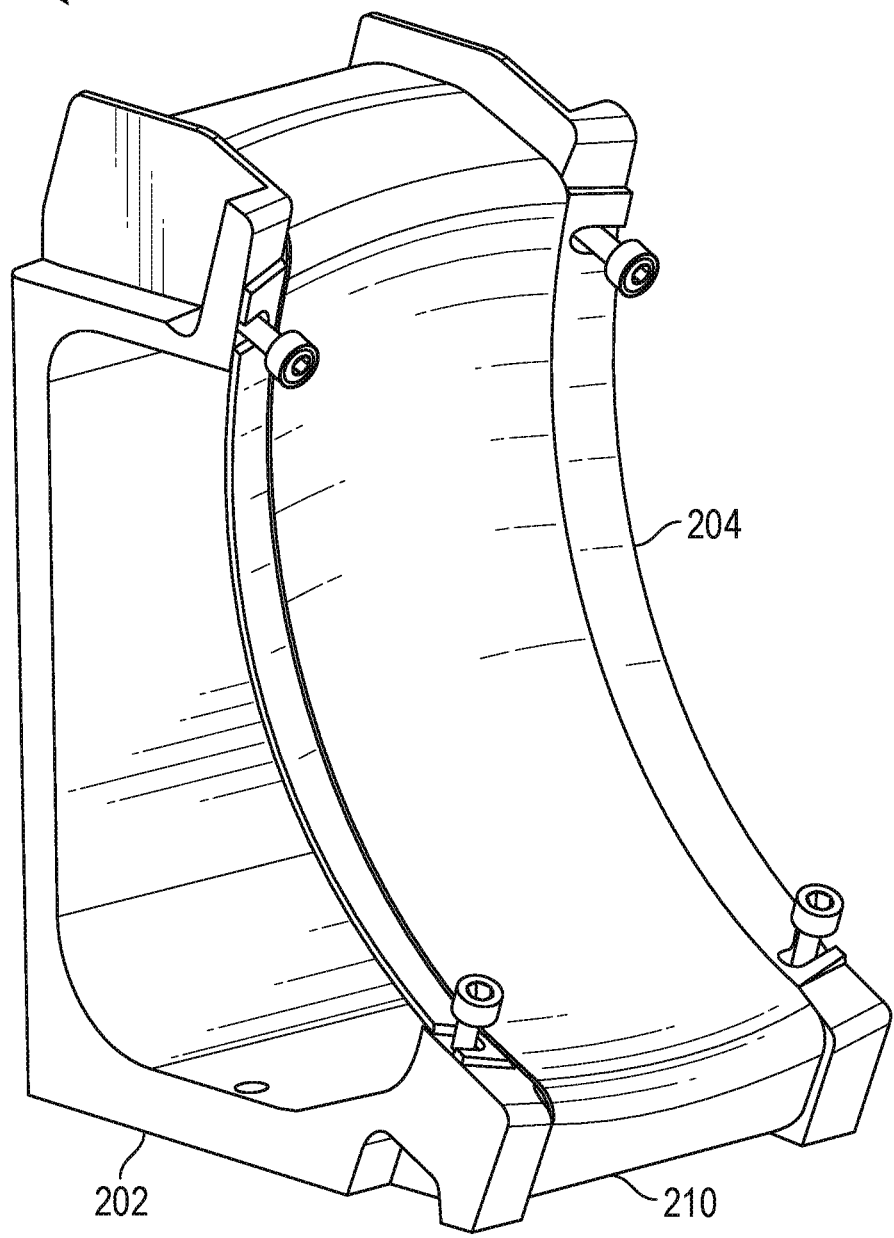
FIG. 2 is a perspective view of a partial exemplary coil subassembly for employing the Lorentz force for orientation purposes.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

In some spacecraft, a corresponding payload may be required to maintain a line-of-sight (LOS) to a destination point for the payload to be fully operational (e.g., to maintain a communication link between a pair of communication terminals). Such a system may be employed in a vehicle residing in earth orbit, such as a geostationary earth orbit (GEO), but may also be employed in other applications as well. One particular type of communication system that typically relies on an LOS communication link is an optical (e.g., laser) communication system that employs a highly collimated laser beam with only a few microradians of divergence and approximately 30 centimeters (cm) in width. In some situations, maintaining LOS with such a beam may involve the use on the vehicle of one or more large mirrors approximately 45 cm wide for deflecting and steering the beam. Given the extensive distances involved in such communication, steering accuracy in the microradian and nanoradian range is generally required for such a beam.

Complicating the ability of a vehicle to steer a communication beam with such accuracy are the vibration and other dynamics of the vehicle itself, as minor physical disturbances may be sufficient to disrupt LOS. To mitigate these disturbances, the communication payload, including the mirror noted above, is often carried on a vibration-dampening platform to mechanically buffer the payload from the spacecraft. Typically, such platforms are custom-designed for each particular application, taking into account various characteristics of the vehicle (e.g., vibration profile) and the payload (e.g., mass, volume, communication link budget, and so on).

The present disclosure is generally directed to systems and methods for controlling a Lorentz-force-based apparatus (e.g., controlling the orientation and/or translation of the apparatus). As will be explained in greater detail below, embodiments of the instant disclosure may facilitate an orientation system (e.g., for a communication system carried on a space vehicle) that physically isolates a platform and/or payload coupled to the orientation system (e.g., via levitation) from vibrations or other unwanted movements of the vehicle. Moreover, some examples of the orientation system may facilitate movement of a platform and/or payload about at least two axes (e.g., pitch and yaw) relative to the vehicle. Other embodiments employing similar concepts may provide translation and/or orientation, up to six degrees of freedom.

The following will provide, with reference to FIGS. 1-20, detailed descriptions of systems and methods of controlling a Lorentz-force-based apparatus. An overall description of the use of the Lorentz force in various embodiments presented herein is provided in conjunction with FIG. 1. A discussion of an exemplary coil subassembly employing the Lorentz force is provided in connection with FIGS. 2-5. A corresponding exemplary magnet subassembly for use with the exemplary coil subassembly is presented in reference to FIG. 6. A combination of the exemplary magnet subassembly and the exemplary coil subassembly, as depicted in FIG. 7, is discussed below as well. In connection with FIGS. 8 and 9, an exemplary levitating platform employing multiple coil/magnet subassemblies is described. The following further includes a description in conjunction with FIG. 10 of an exemplary system including the exemplary levitating platform depicted in FIGS. 8 and 9. In relation to FIG. 11, a discussion of an exemplary method of employing the Lorentz force using the exemplary coil subassembly is presented. In addition, with reference to FIG. 12, a discussion is provided of an exemplary control loop for operating the exemplary levitating platform of FIGS. 8 and 9 within the exemplary system of FIG. 10. A description of an exemplary force constant compensation and coil commutation block that may be used in the control loop of FIG. 12 is presented in conjunction with FIG. 13. A discussion of potential differences in magnetic flux density experienced by the exemplary coil subassembly at various positions relative to the magnet subassembly is set forth in connection with FIGS. 14-16. A method of controlling a Lorentz-force-based apparatus is discussed in view of FIG. 17. A description of an exemplary control example involving commutation employing coils of the exemplary coil subassembly introduced above is provided in conjunction with FIGS. 18-20.

In the following detailed description, references are made to various directions or orientations (e.g., upper, lower, vertical, horizontal, roll, pitch, yaw, elevation, azimuth, and the like). These references are provided for convenience in describing various aspects of the embodiments and examples presented below, and are not intended to limit the orientation of exemplary embodiments discussed herein. While the various embodiments of the exemplary assemblies and subassemblies are presented in connection with a horizontally oriented platform, other orientations of the various embodiments are also possible.

Moreover, while various embodiments are described below in conjunction with a space vehicle, the examples described herein are not limited to such an environment, but may be employed in locations exposed to greater levels of gravitational force, including, but not limited to, a terrestrial surface. In addition, while some examples described below particularly note the use of optical communications devices or systems as potential payloads for the exemplary levitating platforms described hereafter, other types of payloads or devices (e.g., high-resolution imagers, high-frequency (e.g., radio-frequency (RF)) devices, medical devices, haptic devices, and so on) may also benefit from the orientation and/or translation capabilities associated with the levitating platforms.

FIG. 1 is a graphical representation of an exemplary high-level structure 100 for employing the Lorentz force for movement purposes, such as for orientation and/or translation. Included in structure 100 are two magnets 101 of opposing polarity that generate a magnetic field 102 in a volume in which at least a portion of a first conductive coil 110 and a second conductive coil 120 are located. In some examples, the corresponding portions of first conductive coil 110 and second conductive coil 120 residing between magnets 101 in magnetic field 102 may be oriented orthogonally or perpendicularly to each other and the magnetic field 102. Corresponding to these orientations, in the particular example of FIG. 1, first conductive coil 110 is shown with an electrical current 112 flowing downward along the drawing (e.g., toward the bottom of the page), and second conductive coil 120 is depicted with an electrical current 122 flowing out of the drawing (e.g., toward the reader).

The Lorentz force for a linear conductor (e.g., a portion of a single wire of first conductive coil 110 or second conductive coil 120) may be defined as the cross-product of a vector describing the current carried in the length of the single wire and the vector indicating the magnetic field. In other words, $F=(I*wire) \times B$, where F is the vector of the Lorentz force on the wire, I is the magnitude of the electrical current, wire is the vector indicating the length of the wire in the magnetic field and the direction of the current in the wire, and B is the magnetic field vector. According to the right-hand rule, based on the direction of currents 112 and 122 and the magnetic field 102, first conductive coil 110 may experience a Lorentz force 114 relative to magnets 101 that is directed out of the drawing (e.g., toward the reader) and second conductive coil 120 may encounter a Lorentz force 124 relative to magnets 101 that is directed upward along the drawing (e.g. toward the top of the page). Additionally, in some examples, current 112 and/or 122 may be reversed, thus causing directly opposing Lorentz forces 114 and/or 124.

In various embodiments described below, instead of moving first conductive coil 110 and second conductive coil 120 relative to magnets 101 (e.g., viewing magnets 101 as defining a reference frame), the Lorentz force applied to portions of first conductive coil 110 and second conductive coil 120 may cause a subassembly that includes magnets 101 (as well as a platform connected thereto) to move relative to first conductive coil 110 and second conductive coil 120 (e.g., viewing first conductive coil 110 and second conductive coil 120 as defining the reference frame). In some examples, such as those presented below, multiple such arrangements may be used to provide rotational and/or translational movement of such a platform. In other embodiments, a platform may be mechanically coupled to first conductive coil 110 and second conductive coil 120 so that current in first conductive coil 110 and second conductive coil 120 may cause the platform to rotate and/or translate relative to magnets 101.

FIGS. 2-5 are perspective views of an exemplary coil subassembly 200 for employing the Lorentz force for orientation purposes. In some embodiments, as shown to best effect in FIG. 2, a first conductive coil 210 (e.g., including a plurality of turns of conductive wire) is wrapped about an electrically nonconductive body 202 (e.g., plastic, polymer, anodized aluminum, or the like) that includes a contour 204 that defines a portion of a spherical surface. In some embodiments, electrically nonconductive body 202 may be thermally conductive to sink heat from first conductive coil 210, as well as other conductive coils described below. In the particular example of FIGS. 2-5, contour 204 may be a separate portion of material that is screwed, bolted, or otherwise affixed to a remainder of body 202. Additional, in some embodiments, first conductive coil 210 may be generally oriented along a first direction (e.g., vertically from the perspective of the reader), resulting in the portion of first conductive coil 210 at contour 204 being generally oriented vertically and defining the portion of the spherical surface at contour 204.

Figure 3:
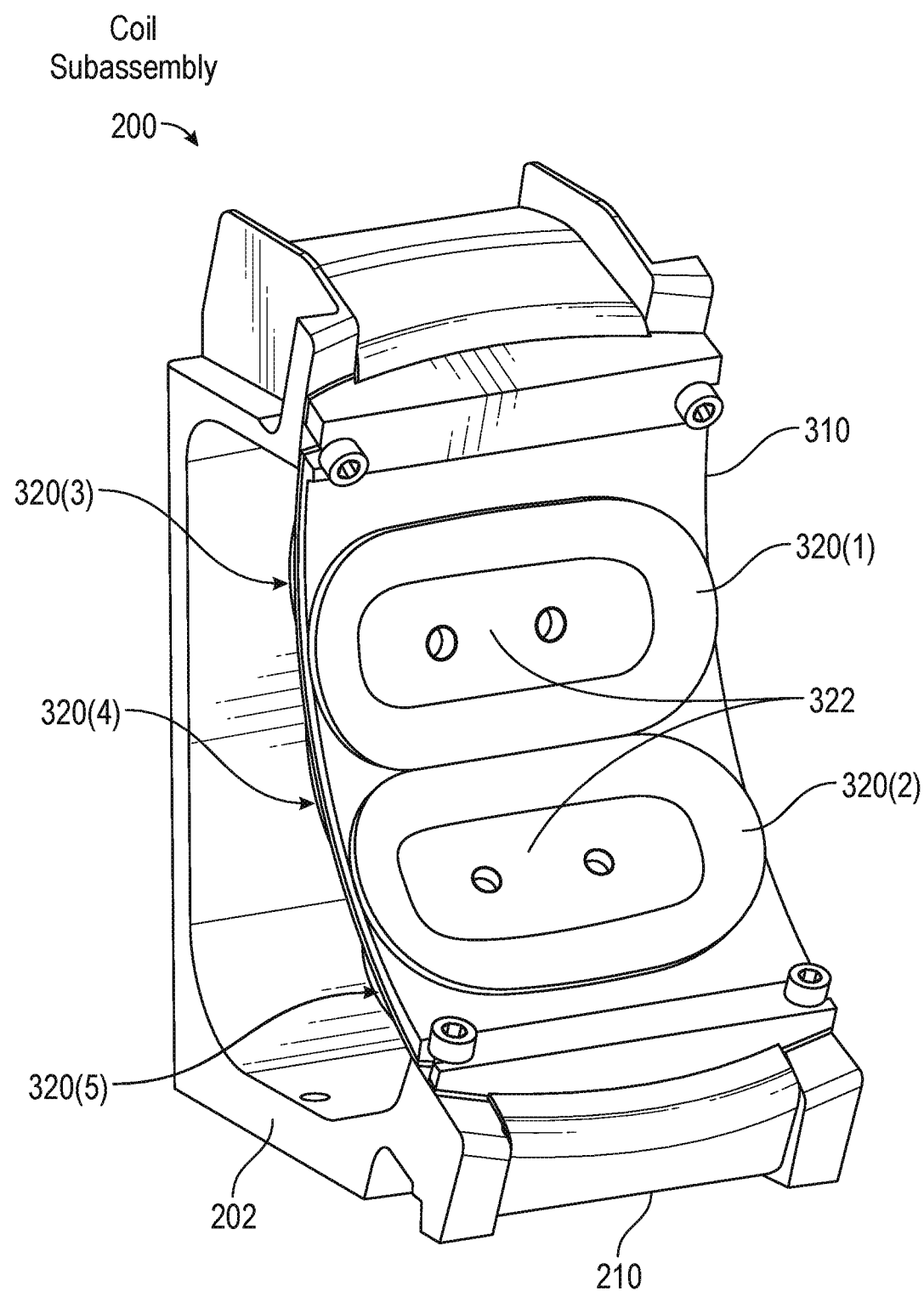
FIG. 3 is a perspective view of a more complete version of the exemplary coil subassembly of FIG. 1.
Figure 4:
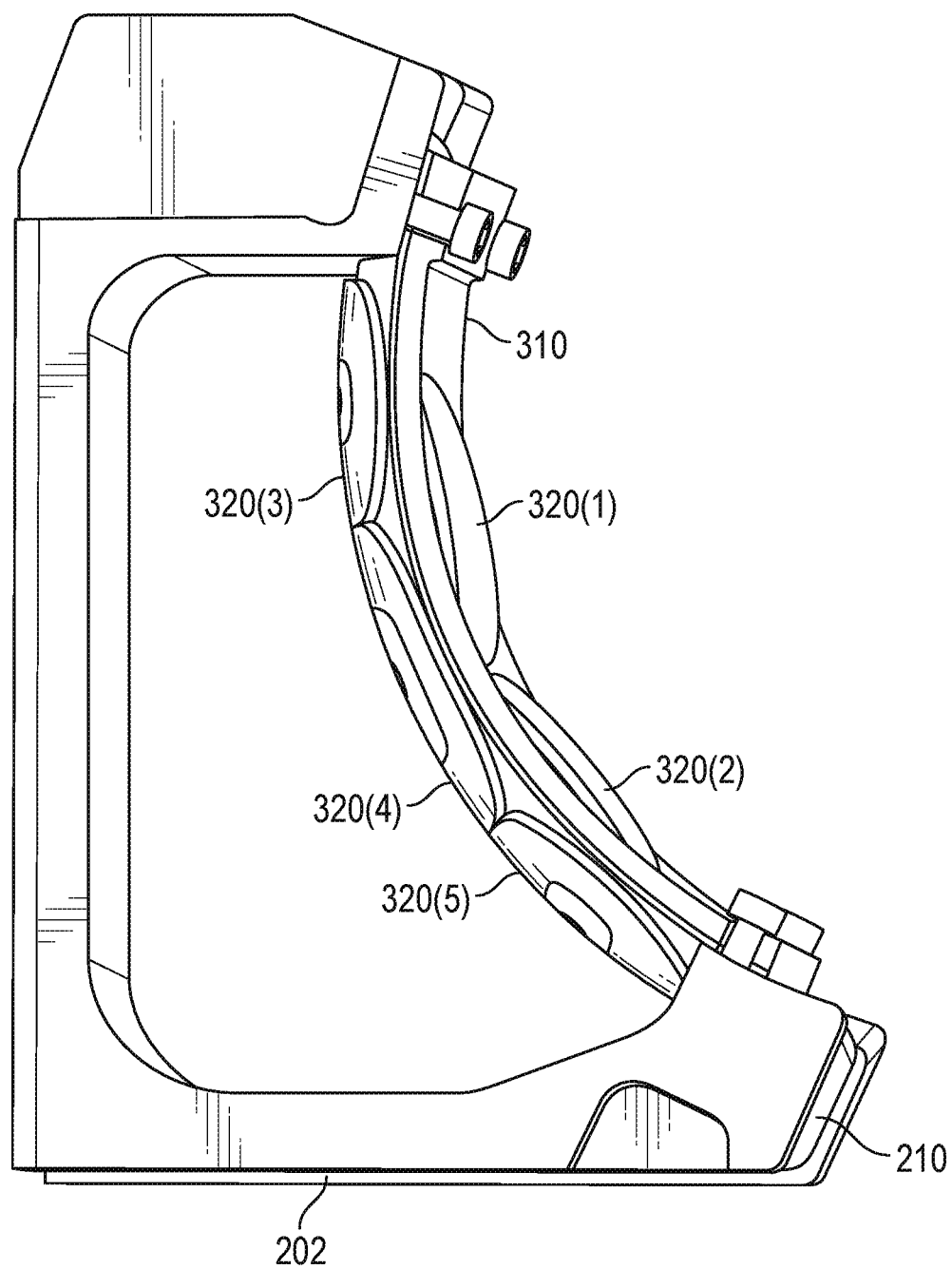
FIG. 4 is another perspective view of the exemplary coil subassembly of FIG. 2.
Figure 5:
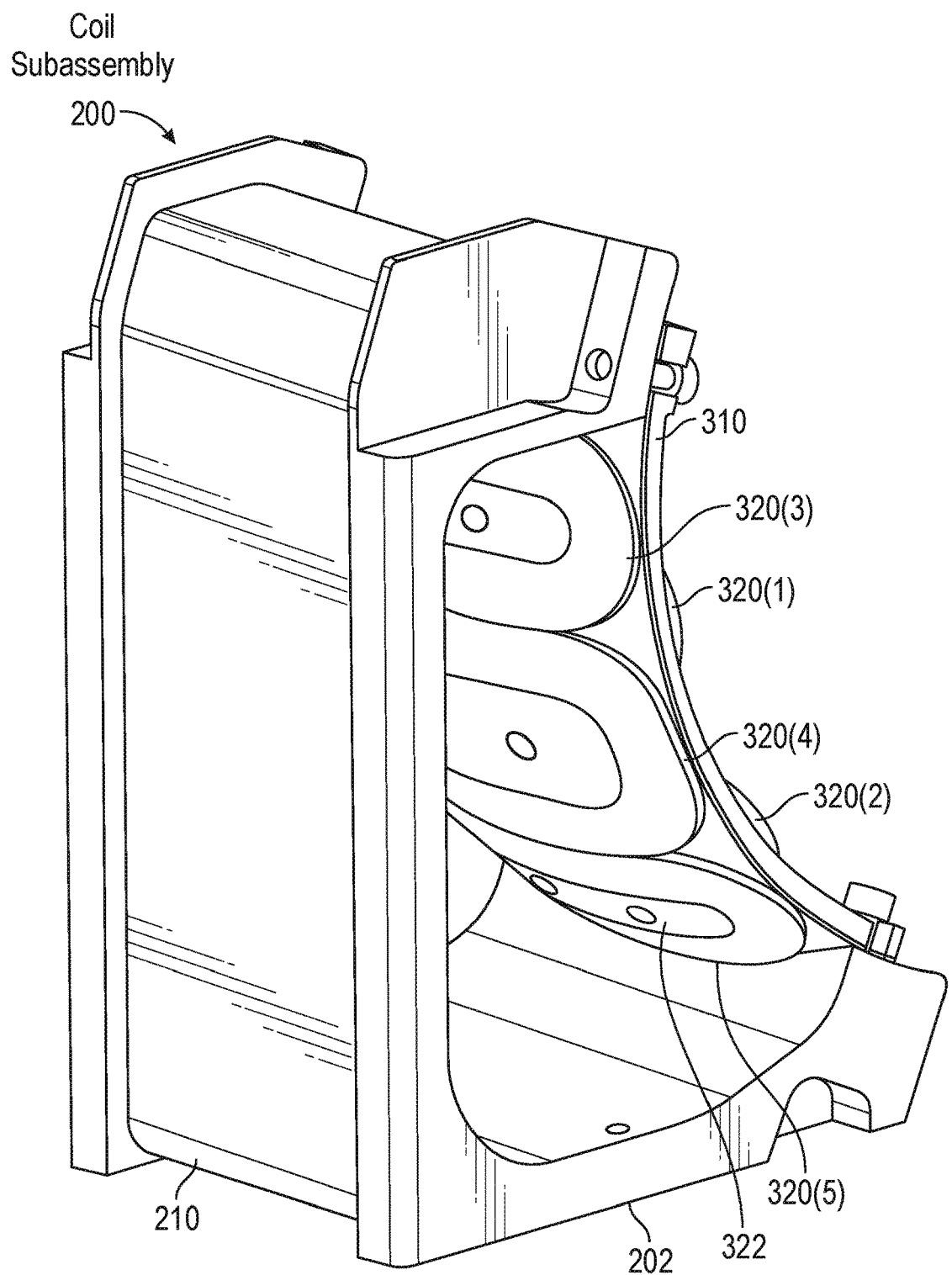
FIG. 5 is a back perspective view of the exemplary coil subassembly of FIG. 2.

In addition, as shown in FIGS. 3-5, coil subassembly 200 may also include a plurality of second conductive coils 320(1) through 320(5) (collectively, second conductive coils 320). However, in other examples, one or more second conductive coils 320 may be employed. As indicated, at least a portion of each of second conductive coils 320 may be routed along the spherical surface defined by first conductive coil 210 and contour 204. In the particular example of FIGS. 3-5, three second conductive coils 320 (e.g., second conductive coils 320(3), 320(4), and 320(5)) are positioned and routed along an interior of the body 202 along the portion of the spherical surface. In some embodiments, the three second conductive coils 320(3), 320(4), and 320(5) are wound onto the section of body 202 defining the portion of the spherical surface (e.g., contour 204), opposite first conductive coil 210. Additionally, the remaining two second conductive coils 320(1) and 320(2) may be routed over the portion of the spherical surface at an exterior of body 202. Further, in some examples, a long dimension of each of second conductive coils 320 may be oriented along a second direction (e.g., horizontally from the perspective of the reader).

In some examples, an electrically nonconductive separator 310 may be affixed to body 202 over first conductive coil 210. Also, in some embodiments, separator 310 may include a spool 322 or other feature about which each of second conductive coils 320(1) and 320(2) may be wound. Second conductive coils 320(3), 320(4), and 320(5) may be wound about similar spools 322 or other features to route second conductive coils 320(3), 320(4), and 320(5) over the portion of the spherical surface of contour 204.

Also, as illustrated in FIGS. 3-5, each second conductive coil 320 may define a central open area as a result being wound around spool 322. In some examples, the width of the central open area for each second conductive coil 320 (e.g., along the vertical direction) may be approximately twice the width of each second conductive coil 320. Further, as best shown in FIGS. 3 and 5, exterior second conductive coils 320(1) and 320(2) are aligned adjacent to each other, as are interior second conductive coils 320(3), 320(4), and 320(5). Moreover, as seen in FIG. 4, exterior second conductive coils 320(1) and 320(2) are offset from interior second conductive coils 320(3), 320(4), and 320(5) so that a center portion of second conductive coils 320 (e.g., along a vertical center portion of contour 204) substantially cover an entirety of a vertical center portion of contour 204 with little overlap of second conductive coils 320. In other examples, different numbers, sizes, and configurations of second conductive coils 320 may be employed.

Figure 6:
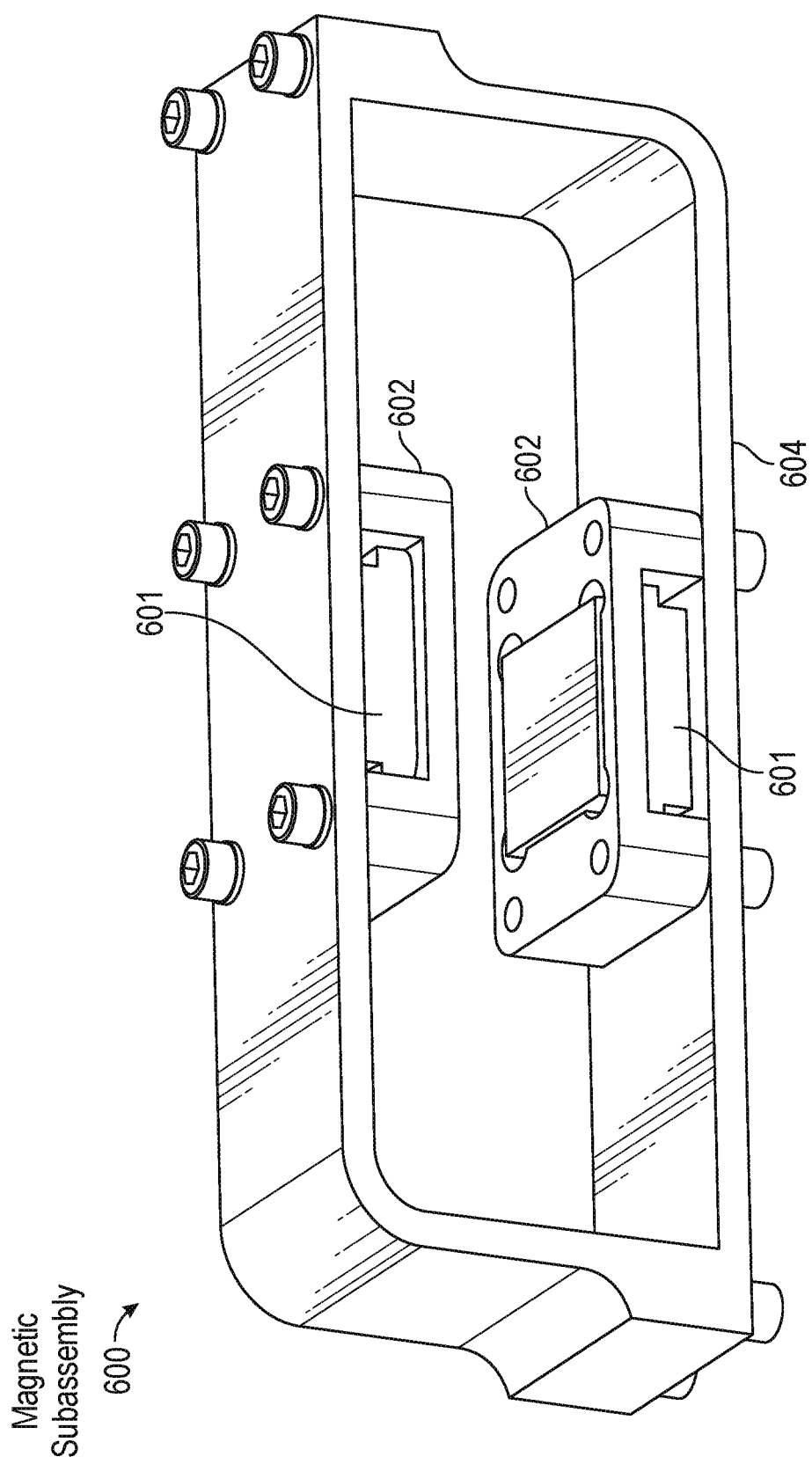
FIG. 6 is a perspective view of an exemplary magnet subassembly for employing the Lorentz force for orientation purposes.
Figure 7:
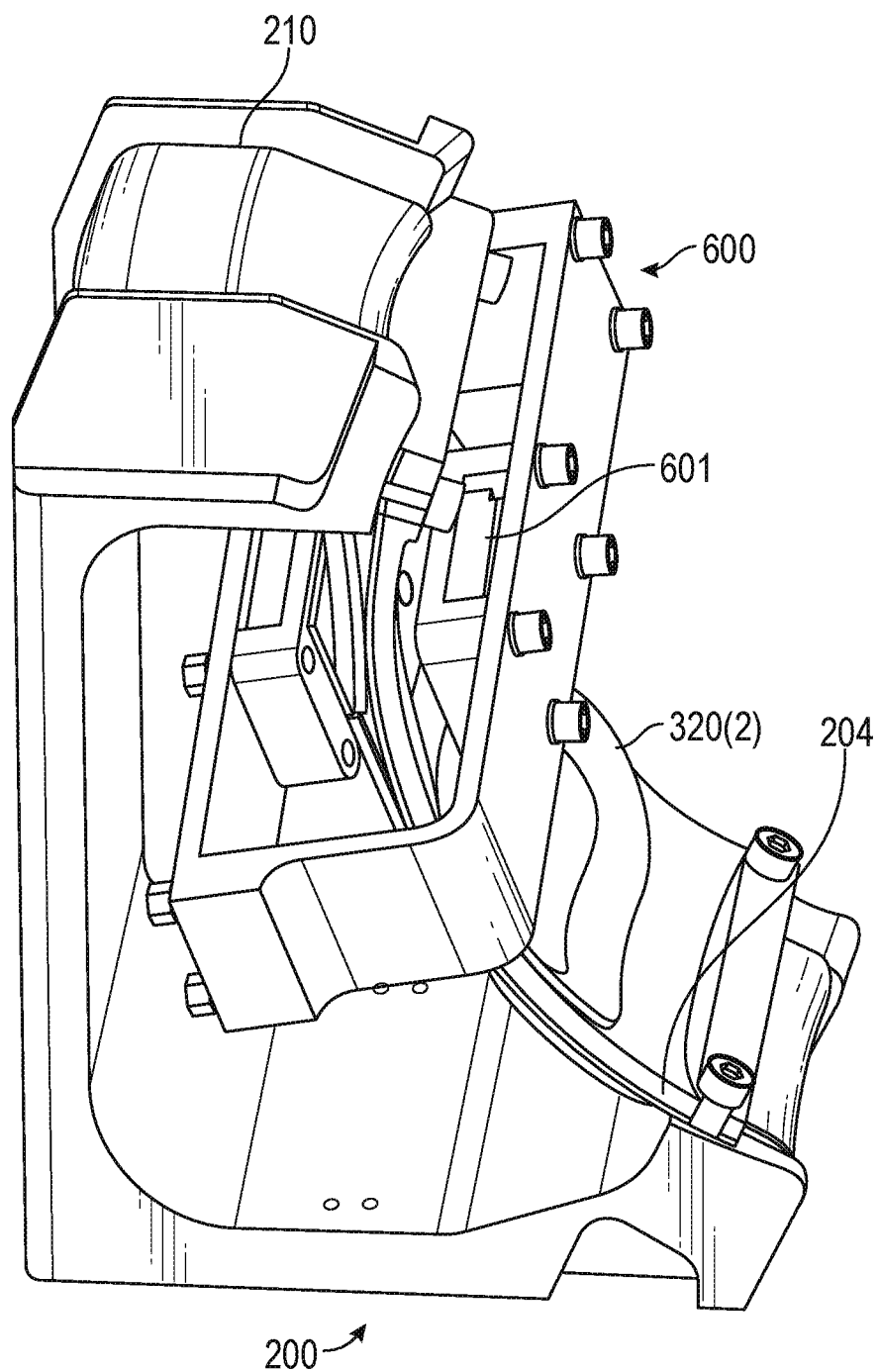
FIG. 7 is a perspective view of an exemplary combination of the exemplary coil subassembly of FIG. 2 and the exemplary magnet subassembly of FIG. 6.

FIG. 6 is a perspective view of an exemplary magnet subassembly 600 for employing the Lorentz force for orientation (and possibly translation) purposes. In some examples, magnets 601 with opposing poles facing either other are held within magnet retainers 602 at opposing interior surfaces of a conductive flux carrier 604. Accordingly, a magnetic field is formed between magnets 601, with the remaining magnetic flux being carried within flux carrier 604 to facilitate containment of the magnetic field. Thus, magnets 601 fill a role similar to magnets 101 of FIG. 1.

FIG. 7 is a perspective view of an exemplary combination of exemplary coil subassembly 200 of FIGS. 2-5 and exemplary magnet subassembly 600 of FIG. 6. In some examples, magnets 601 are positioned on either side of contour 204 defining a portion of a spherical surface so that a relatively small area of first conductive coil 210 and at least one second conductive coil 320 lie therebetween. In at least some examples, the magnetic field generated by magnets 601 is directed along a third direction orthogonal to the first and second directions corresponding to first conductive coil 210 and second conductive coils 320 (e.g., normal to contour 204). Moreover, in some embodiments, first conductive coil 210 may serve as first conductive coil 110 of FIG. 1, while second conductive coils 320 may collectively operate as second conductive coil 120 of FIG. 1. Consequently, in response to current flowing in first conductive coil 210, magnet subassembly 600 may move laterally within a range within the vertical central region of contour 204 due to the resulting Lorentz force. Furthermore, in response to current flowing in one or more of second conductive coils 320, magnet subassembly 600 may move vertically along contour 204, as caused by the generated Lorentz force.

Figure 8:
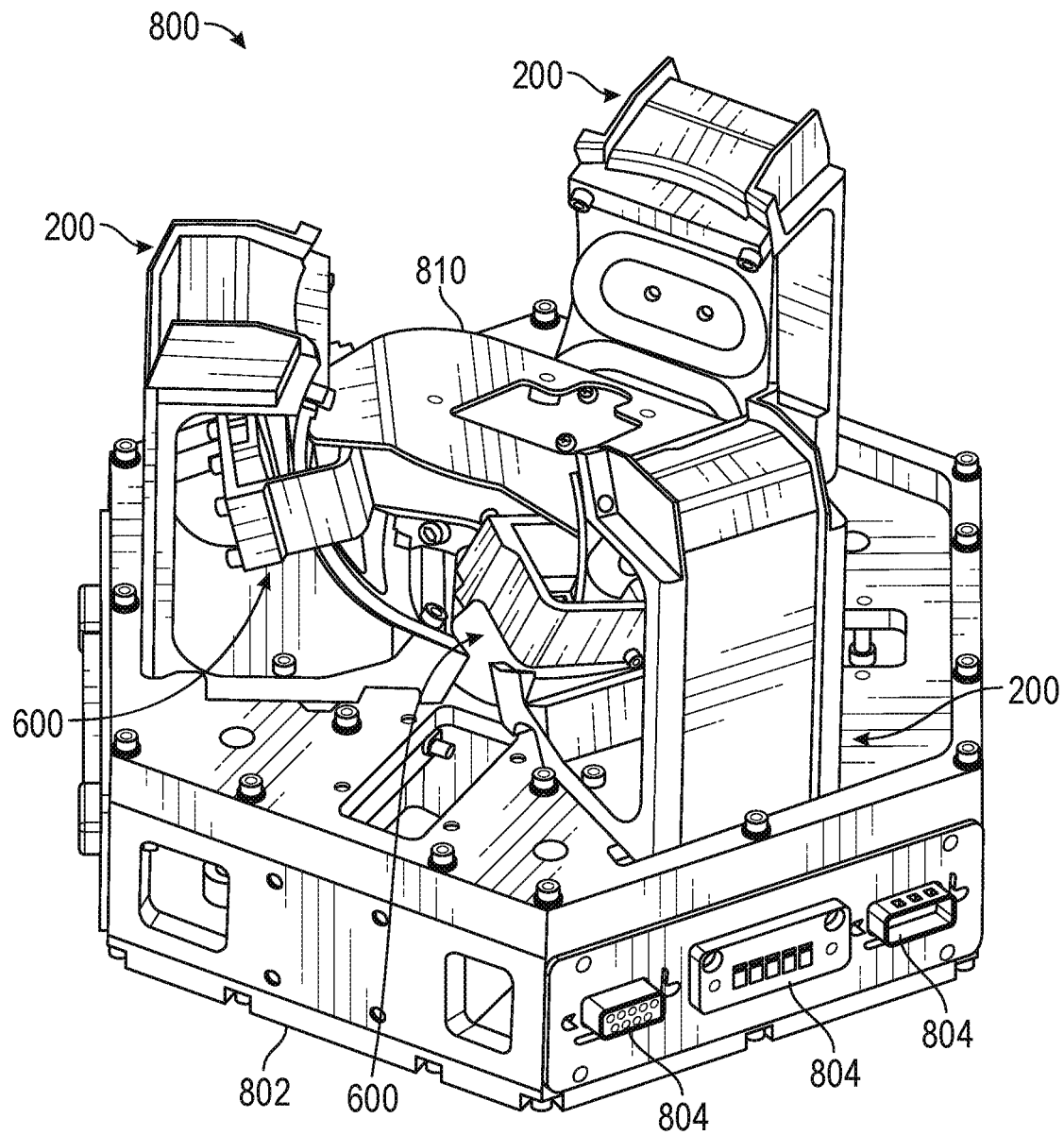
FIG. 8 is a perspective view of a partial exemplary levitating platform including multiple exemplary coil/magnet subassembly combinations of FIG. 7.

In some embodiments, multiple such combinations of coil subassembly 200 and magnet subassembly 600 may be employed to provide movement of an attached platform about two rotational axes to facilitate orientation of the platform. FIG. 8 is a perspective view of a partial exemplary levitating platform 800 including three exemplary coil/magnet subassembly combinations of FIG. 7. However, in other examples, two or more such combinations may be employed to perform other types of movement involving multiple degrees of freedom, translationally and/or rotationally. As depicted in FIG. 8, three coil subassemblies 200 are implemented as part of a stator assembly 802 to fix the relative positions and orientations of coil subassemblies 200. In some examples, such as that shown in FIG. 8, coil subassemblies 200 may be positioned equidistant about stator assembly 802, 120 degrees apart. Other arrangements of coil subassemblies 200 are possible in other embodiments. Moreover, coil subassemblies 200 may be arranged such that contours 204 of coil subassemblies 200 define different portions of the same virtual spherical surface.

Stator assembly 802, in some examples, may be securely attached to a space vehicle or other system. Additionally, in some embodiments, stator assembly 802 may also include one or more connectors 804 for coupling electrical power and/or signals with stator assembly 802. Such signals, in some examples, may include electrical currents for each of coil subassemblies 200. Stator assembly 802 may also include sensors and other devices, as described more fully below in conjunction with FIG. 9.

Each coil subassembly 200 of FIG. 8 may be magnetically coupled with a corresponding magnet subassembly 600, as shown in the combination depicted in FIG. 7. Moreover, magnet subassemblies 600 may be coupled to a platform 810. Accordingly, in response to the Lorentz force movement of magnet subassemblies 600 described above, platform 810 may be rotated in at least two directions: pitch (e.g., elevation, or up and down along a first conductive coil 210) and yaw (e.g., azimuth, or left and right along a second conductive coil 320). In some examples, some measure of rotation about a roll axis, as well as some measure of translation along one or more axes, is also possible. In some other embodiments (e.g., communication beam systems), rotation in the roll direction may not be necessary, as implementing roll may not affect LOS of a beam being received and/or transmitted by a communication device or system.

In some examples, such as that shown in FIG. 8, as well as others not specifically described herein, multiple coil subassemblies 200 and magnet subassemblies 600 may be positioned and employed to provide six degrees of freedom (e.g., translation along and rotation about three independent, orthogonal axes). More specifically, in at least some embodiments, the interaction of coil subassemblies 200 and magnet subassemblies 600 in response to electrical current flowing in the coils of coil subassemblies 200 may provide a significant amount of rotational freedom about two orthogonal axes lying in a plane defined by stator assembly 802 due to the alignment of the coils. Additionally, in some examples, this same coil alignment may facilitate at least some three-axis translation (e.g., along the two orthogonal axes in the plane defined by stator assembly 802, as well as along a third axis orthogonal to that plane), which may be beneficial for maintaining a translational position of platform 810 (e.g., to implement vibration isolation). Moreover, as a result of the interaction of coil subassemblies 200 and magnet subassemblies 600, some amount of rotation of platform 810 about the third axis may also be provided in some examples, thus potentially providing the six degrees of freedom.

While the embodiments of FIG. 8 depict coil subassemblies 200 implemented as portions of stator assembly 802, and multiple magnet subassemblies 600 mechanically coupled to platform 810, other embodiments in which magnet subassemblies 600 are included in stator assembly 802 while coil subassemblies 200 are mechanically coupled to platform 810 to facilitate movement of platform 810 relative to stator assembly 802 are also possible.

Figure 9:
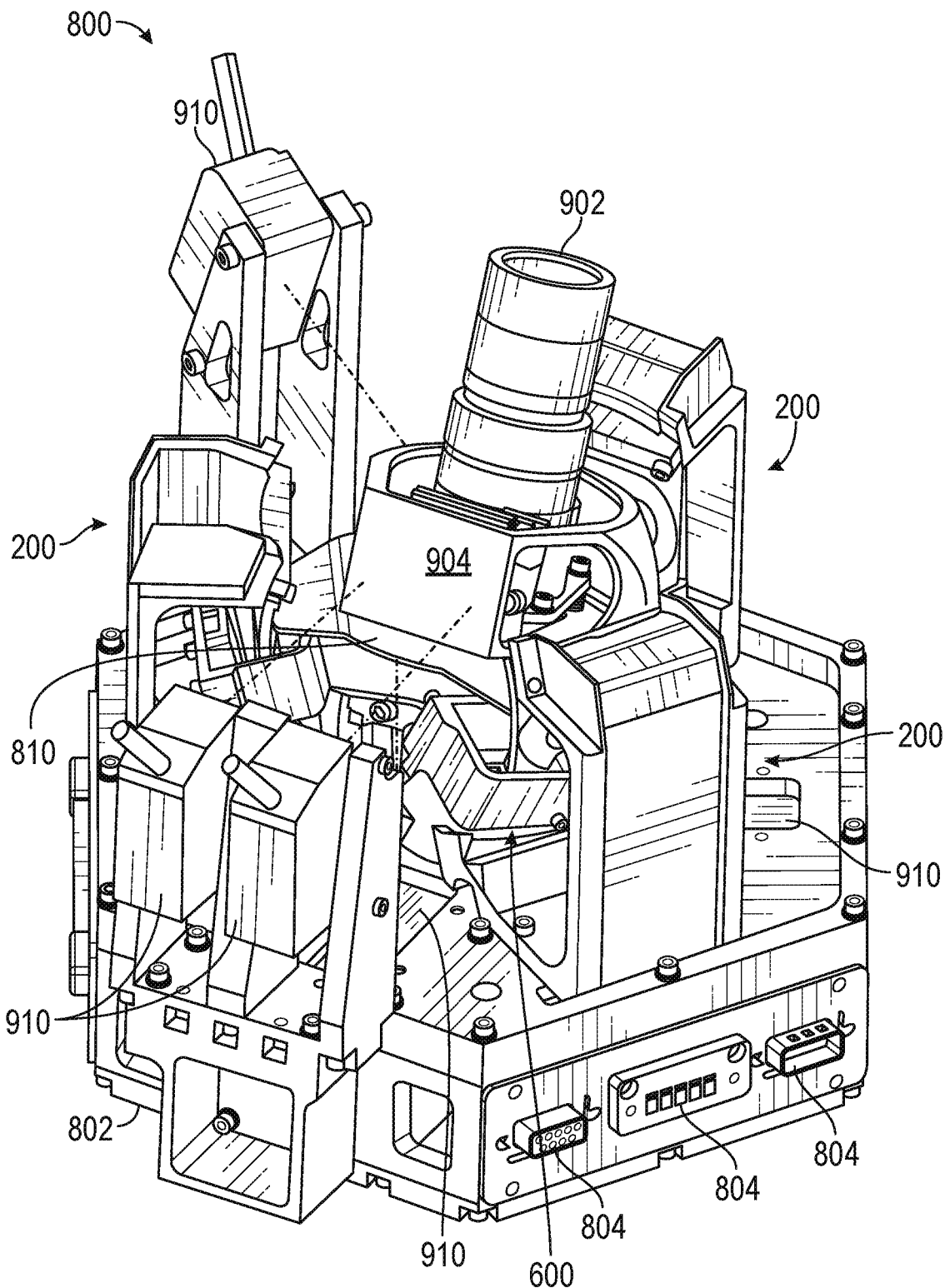
FIG. 9 is a perspective view of a more complete version of the exemplary levitating platform of FIG. 8.

FIG. 9 is a perspective view of a more complete version of exemplary levitating platform 800 of FIG. 8. Levitating platform 800 in this example may include a payload 902 (e.g., in this case, a camera) affixed atop platform 810. In other examples, payload 902 may be an optical beam communication system that receives and/transmits an optical LOS beam carrying information.

Also possibly attached to platform 810 is a sensor reflection structure 904 that may interact with multiple sensors 910 attached to stator assembly 802. In some examples, sensors 910 may be optical (e.g., laser) distance sensors (e.g., optical non-contact displacement transducers, or optoNCDTs, as manufactured by Micro-Epsilon Messtechnik GmbH & Co.), which may be displacement lasers that determine a distance to an object using triangulation of a reflected laser light. However, other types of sensors (e.g., distance, rotational, inertial, and so on) may be employed in other embodiments.

In FIG. 9, sensors 910 may be used to determine the current orientation (e.g., around the pitch and yaw axes) of platform 810 and payload 902, such as by way of determining distances between each sensor 910 and platform 810 and/or sensor reflection structure 904. In the example of FIG. 9, two sensors 910 aligned in parallel may be employed to determine two distinct horizontal distances (e.g., horizontal relative to a top surface of stator assembly 802) to a surface of sensor reflection structure 904. Also, a third sensor 910 may measure a distance to a separate surface of sensor reflection structure 904 at an angle above horizontal (e.g., angled downward toward the top surface of stator assembly 802).

Moreover, in these same examples, three sensors 910 located within stator assembly 802 may be distributed (e.g., equidistant) about stator assembly 802 to measure a vertical distance to platform 810 at three separate points about platform 810. Based on the distance measurements from the six sensors 910, the current orientation and/or translational location of platform 810 and attached payload 902 may be determined.

Figure 10:
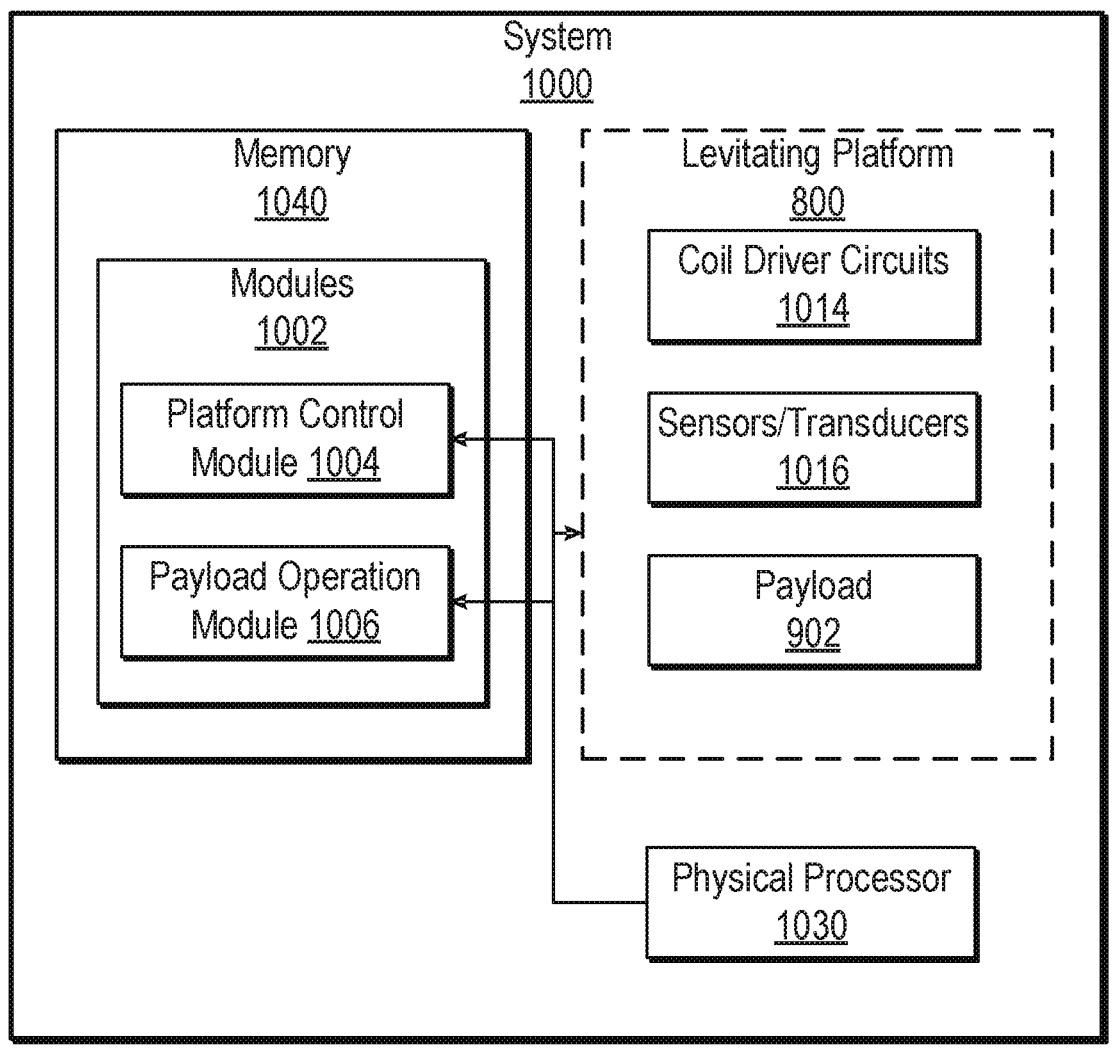
FIG. 10 is a block diagram of an exemplary system including the exemplary levitating platform of FIG. 9.

FIG. 10 is a block diagram of an exemplary system 1000 including levitating platform 800 of FIG. 9. As illustrated in FIG. 10, system 1000 may include one or more modules 1002 for performing one or more tasks. As will be explained in greater detail below, modules 1002 may include a platform control module 1004 and a payload operation module 1006. Although illustrated as separate elements, one or more of modules 1002 in FIG. 10 may represent portions of a single module or application.

In the example embodiments described in greater detail below, system 1000 may be employed as at least a portion of a communication satellite or vehicle that employs one or more levitating platforms 800 and associated payloads 902 for communicating wirelessly with other communication devices, such as an optical beam communication system. Further, as illustrated in FIG. 10, levitating platform 800 may include coil driver circuits 1014, sensors/transducers 1016, and payload 902. In some embodiments, coil driver circuits 1014 may receive one or more signals from platform control module 1004 and deliver electrical current to one or more conductive coils (e.g., first conductive coils 210 and/or second conductive coils 320 of coil subassemblies 200) to generate Lorentz forces to rotate (as well as possibly translate) payload 902, as discussed earlier, as well as to maintain physical isolation (e.g., via levitation) between a rotor assembly that includes magnet subassembly 600, platform 810, and payload 902 from the remainder of the system (e.g., coil subassemblies 200). Sensors/transducers 1016 (e.g., sensors 910) may provide signals to platform control module 1004 indicating a current rotational and/or translational position of payload 902 to facilitate rotational and/or translational control of payload 902 by platform control module 1004. In some examples, coil driver circuits 1014 and/or sensors/transducers 1016 may be a part of stator assembly 802, or may be located exterior to stator assembly 802.

In some embodiments, in addition to sensors 910, sensors/transducers 1016 may include other types of sensing devices, such as a microelectromechanical system (MEMS) inertial reference unit (IRU) that may include accelerometers, gyroscopes, and/or other components to provide additional information regarding the current rotational attitude and/or translational position of platform 810 and/or stator assembly 802 (e.g., relative to some reference location and/or orientation). Such information may be utilized for stabilization control in the face of various motion perturbations, such as vehicle vibrations.

Regarding modules 1002, platform control module 1004, in some examples, may receive the position signals (as well as other signals indicating a current state of levitating platform 800 and/or payload 902, including inertial and/or gyroscopic information) from sensors/transducers 1016, determine the current rotational position (and possibly other aspects) of payload 902, and, based on that information, generate signals to be provided to coil driver circuits 1014 to position payload 902 as desired. In some embodiments, platform control module 1004 may receive information from the vehicle or other system (e.g., sensor information) upon which platform control module 1004 may base the signals being provided to coil driver circuits 1014.

Payload operation module 1006, in some embodiments, may generate and/or receive signals to payload 902 to facilitate operation of payload 902. For examples in which payload 902 is a communication system, payload operation module 1006 may generate outgoing communication data to be transmitted using payload 902, and/or may collect and/or process incoming communication data received via payload 902. In some examples, payload operation module 1006 may also receive and/or generate additional information regarding the operation of payload 902, such as control and/or status information (e.g., received signal strength information, error or fault conditions generated by payload 902, and so on) and generate signals for either or both of payload 902 and coil driver circuits 1014 based on that information. In some embodiments, payload operation module 1006 may receive other information (e.g., positioning and attitude information for the vehicle and/or another communication system) upon which the signals for payload 902 and/or coil driver circuits 1014 may be based.

In certain embodiments, one or more of modules 1002 in FIG. 10 may represent one or more software applications or programs that, when executed by a computing device, may cause the computing device to perform one or more tasks. One or more of modules 1002 in FIG. 10 may also represent all or portions of one or more special-purpose computers configured to perform one or more tasks. Additionally, in some embodiments, one or more of modules 1002 may include special-purpose hardware for performing some of the tasks ascribed to modules 1002.

As illustrated in FIG. 10, example system 1000 may also include one or more memory devices, such as memory 1040. Memory 1040 generally represents any type or form of volatile or non-volatile storage device or medium capable of storing data and/or computer-readable instructions. In one example, memory 1040 may store, load, and/or maintain one or more of modules 1002. As illustrated in FIG. 10, example system 1000 may also include one or more physical processors, such as physical processor 1030, that may access and/or modify one or more of modules 1002 stored in memory 940. Additionally or alternatively, physical processor 1030 may execute one or more of modules 1002. In yet other example embodiments, one or more of modules 1002, or portions thereof, instead may be implemented as hardware components not stored in memory 1040, such as electronic circuitry for performing one or more tasks described above.

Figure 11:
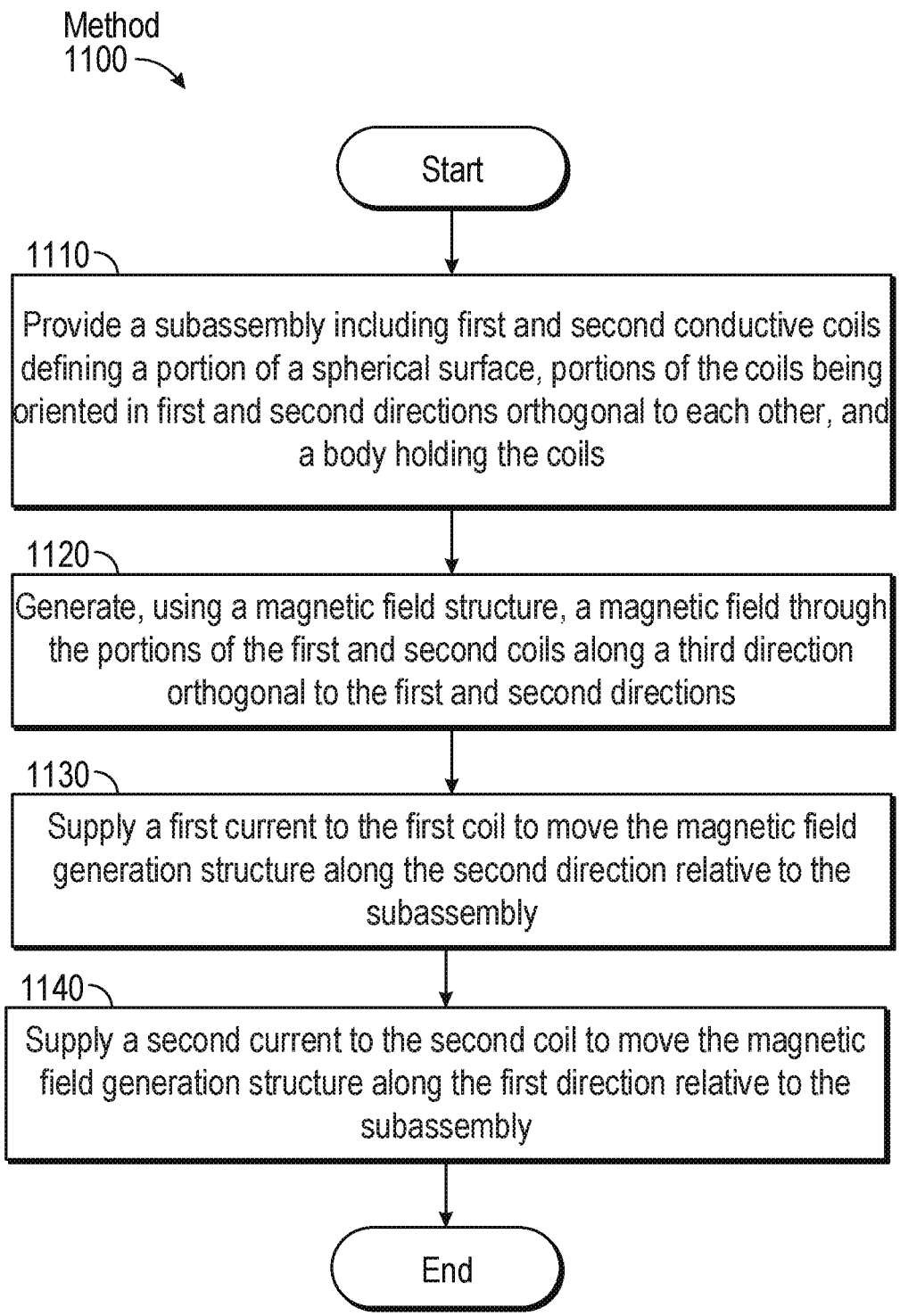
FIG. 11 is a flow diagram of an exemplary method employing the Lorentz force using a coil subassembly.
Figure 12:
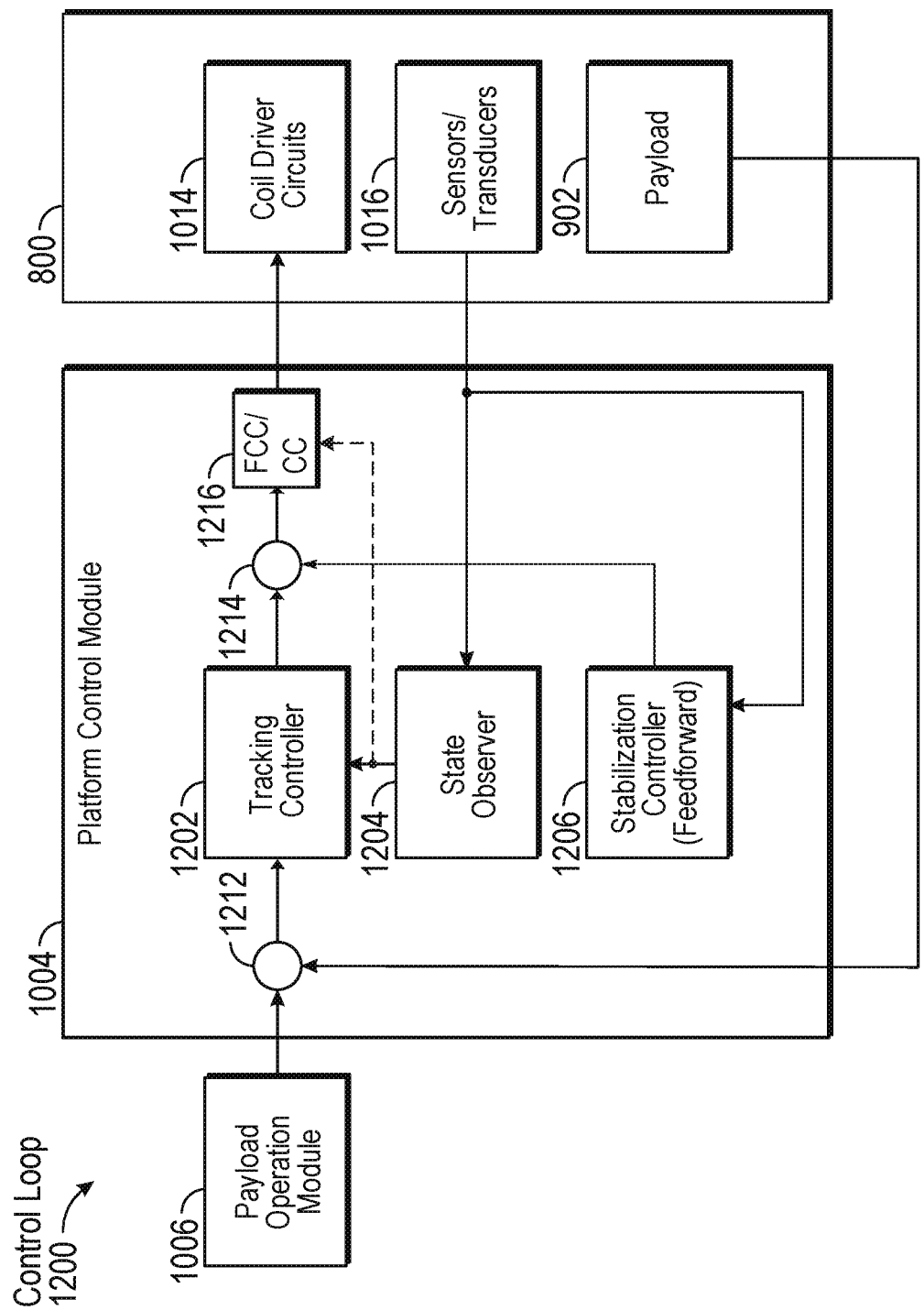
FIG. 12 is a block diagram of an exemplary control loop for operating the exemplary levitating platform of FIG. 9.

FIG. 11 is a flow diagram of an exemplary method 1100 employing the Lorentz force using a coil subassembly (e.g., coil subassembly 200). In method 1100, at step 1110, a subassembly may be provided that includes a first conductive coil (e.g., first conductive coil 210) and a second conductive coil (e.g., second conductive coil 320). In some examples, the first and second conductive coils may be wound on, or otherwise attached to, a body so that the relative positions and orientations of the coils remains fixed. At least a portion of the first conductive coil and the second conductive coil may define a portion of a spherical surface, where at least a portion of the first conductive coil is oriented along a first direction of the portion of the spherical surface, and at least a portion of the second conductive coil is oriented along a second direction along the portion of the spherical surface and is orthogonal to the first direction.

At step 1120, a magnetic field may be generated (e.g., using magnet subassembly 600) through the portions of the first and second conductive coils along a third direction orthogonal to the first and second directions. In some examples, the third direction is substantially normal to the portion of the spherical surface. At step 1130, a first current may be supplied to the first conductive coil to move a magnetic field generation structure (e.g., magnet subassembly 600) along the second direction relative to the subassembly. At step 1140, a second current may be supplied to the second conductive coil to move the magnetic field generation structure along the first direction relative to the subassembly. In some examples, platform control module 1004 may perform steps 1130 and/or 1140.

FIG. 12 is a block diagram of an exemplary control loop 1200 for operating a levitating platform (e.g., levitating platform 800 of FIG. 9). Control loop 1200, in some examples, may be implemented using one or more of payload operation module 1006, platform control module 1004, coil driver circuits 1014, sensors/transducers 1016, and/or payload 902. As shown, control loop 1200 may implement one or both of a feedback loop (e.g., using a first signal combiner 1212) and a feedforward loop (e.g., using a second signal combiner 1214). In some embodiments, signal combiners 1212 and 1214 may generate a difference or error signal between input signals. However, other types of signal combiners may be employed in other examples. In some embodiments, the feedback loop may receive a signal indicating a signal from payload operation module 1006 indicating an expected or intended value to be received from payload 902, such as an expected status signal (e.g., an expected received signal strength indicator value, an expected attitude value, etc.), and subtract or otherwise compare an actual status signal from payload 902 to generate an error or difference signal for a tracking controller 1202 of platform control module 1004 (e.g., for LOS control). In some examples, status signals from payload 902 may include error or difference signals from one or more optical sensing devices, such as a beacon camera, a quadrant detector, and the like, that may detect and track an optical communication signal, an optical beacon signal associated with a communication signal, or other signal for proper LOS tracking. Other types of sensors for acquisition and tracking may also be employed in association with payload 902.

Tracking controller 1202, in some examples, may implement any type of control strategy or functionality for use in generating electrical current for first conductive coil 210 and second conductive coils 320 via coil driver circuits 1014. One example of tracking controller 1202 may be a proportional-integral-derivative (PID) controller, but many other types of tracking controller 1202 may be employed in control loop 1200.

In addition, in some embodiments, platform control module 1004 may include a state observer 1204 that may determine a current state of levitating platform 800 based on signals received from sensors/transducers 1016, discussed above. State observer 1204, for example, may determine a current orientation and/or translational position of payload 902, a rotational and/or translational velocity of payload 902, and so on based on measurements and other status information regarding levitating platform 800 and/or the vehicle in which levitating platform 800 may be carried. Based on the error or difference information and/or the current state of levitating platform 800, tracking controller 1202 may generate signals to drive coil driver circuits 1014 to control the movement of payload 902.

In some examples, the one or more signals generated by tracking controller 1202 may be compared against one or more signals generated by a stabilization controller 1206 in the feedforward loop mentioned above. Stabilization controller 1206, in some embodiments, may receive the same or similar information from sensors/transducers 1016 (e.g., a MEMS IRU or similar components, as described above) indicating a current state of levitating platform 800, payload 902, and/or the vehicle and process that information to provide stabilization of levitating platform 800. Signal combiner 1214 may subtract signals from stabilization controller 1206 from the output signals of tracking controller 1202, or otherwise combine these signals, to generate signals for a force constant compensation and coil commutation (FCC/CC) block 1216. In some examples, FCC/CC block 1216 may modify the inputs received from signal combiner 1214 to address unit-to-unit gain variation (e.g., gain variations from one levitating platform 800 to another) to provide force constant compensation for this specific levitating platform 800. In some embodiments, such gain variations may be related to the temperature of first conductive coils 210 and/or second conductive coils 320(1)-320(5). Also, in some examples, these gain variations may be characterized for each instance of levitating platform 800 during or after the manufacturing process. FCC/CC block 1216, in some embodiments, may also provide coil commutation (e.g., turning the electrical current to each of the second conductive coils 320 on and off at desired times) depending on the current location and direction of travel of corresponding magnet subassembly 600 relative to each second conductive coil 320(1)-320(5), as well as possibly on other factors. A more detailed discussion regarding an example of coil commutation is presented below in reference to FIGS. 18-20. The output of FCC/CC block 1216 is ultimately employed by coil driver circuits 1014 to operate levitating platform 800 to move payload 902 about using the Lorentz forces described above.

In some embodiments, the feedback loop through signal combiner 1212 may be employed primarily to control levitating platform 800 to ensure acceptable LOS tracking of payload 902 relative to some reference point (e.g., a ground-based or orbiting communication system). The feedforward loop through signal combiner 1214, in comparison, may provide highly-responsive platform stabilization (e.g., maintaining proper orientation of payload 902, maintaining physical isolation of the payload 902 and other portions of the rotor assembly from stator assembly 802 and other components, etc.) in view of vehicle vibrations and/or other system perturbations. However, many other types of control loops providing feedback and/or feedforward loops may be employed in conjunction with levitating platform 800 in other embodiments.

Figure 13:
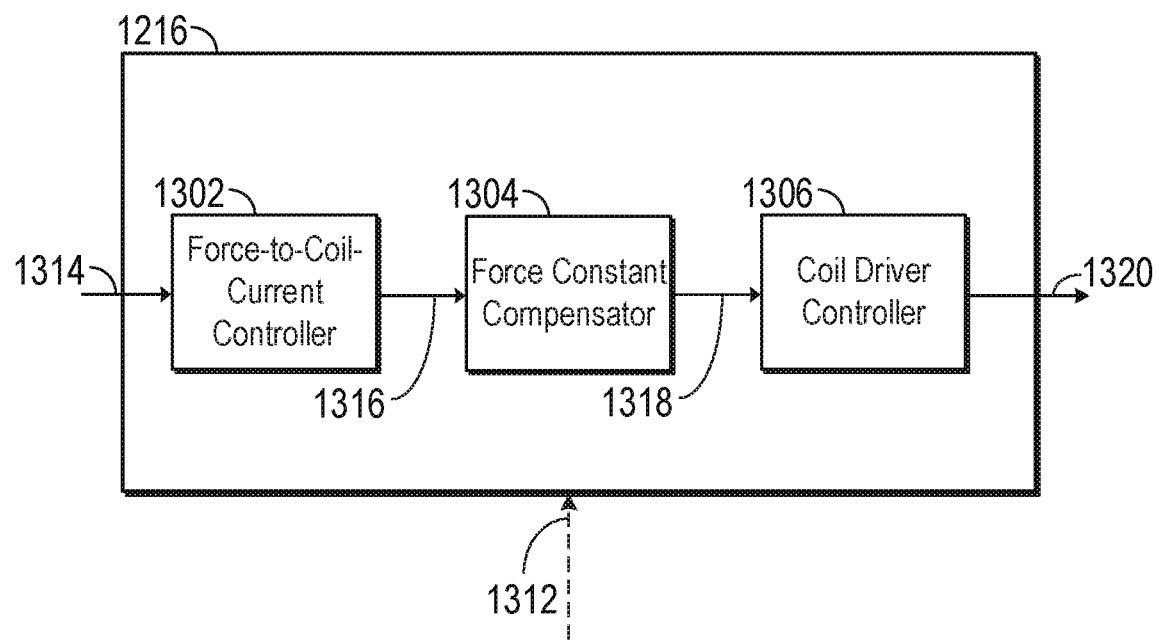
FIG. 13 is a block diagram of an exemplary force constant compensation and coil commutation block employable in the control loop of FIG. 12.

FIG. 13 is a block diagram of an exemplary embodiment of FCC/CC block 1216. As shown, FCC/CC block 1216 may include one or more of a force-to-coil-current (FCC) converter 1302, a force constant compensator 1304, and a coil driver controller 1306. In some examples, FCC converter 1302 may receive a force command 1314 (e.g., from signal combiner 1214) that may indicate one or more forces (e.g., a translation force and/or a torque) to be applied to platform 810 (e.g., to maintain proper alignment of payload 902). In some embodiments, the translational force may be in the form of a translational force vector with individual components aligned along three orthogonal axes (e.g., an x-axis, a y-axis, and a z-axis) relative to stator assembly 802. Further, in some examples, the torque may be expressed as a rotational torque vector with individual components, each of which is associated with a rotation about a separate axis (e.g., about the x-axis, the y-axis, and the z-axis). FCC converter 1302, in some embodiments, may also receive observer information 1312, either directly or indirectly (e.g., via tracking controller 1202) from state observer 1204. In some examples, observer information 1312 may include present translational position and/or rotational orientation information, present translational and/or rotational velocity information, and the like. For example, the current translation position information may include a translational position vector that indicates a current distance of a point of platform 810 (e.g., the center of mass or geographical center of platform 810) from its nominal or centered position (e.g., along the x-axis, the y-axis, and the z-axis). Similarly, in some embodiments, the current rotational orientation information may include a rotational position vector that indicates the current rotational orientation (e.g., about the x-axis, the y-axis, and the z-axis) of platform 810 relative to some nominal orientation.

In some embodiments, based on received observer information 1312, FCC converter 1302 may convert force command 1314 into one or more current commands 1316 that cause electrical current to be applied to first conductive coil 210 and second conductive coils 320 of each coil subassembly 200 to impart the forces and torques on platform 810 that are indicated in force command 1314. For example, in cases in which a physical quantity (e.g., magnetic flux density) may vary based on the present translational position and/or orientation information, FCC converter 1302 may determine the proper electrical current of current commands 1316 to apply to each coil 210, 320 to apply the forces and torques indicated in force commands 1314. Examples involving such variations in magnetic flux density are described in greater detail below in conjunction with FIGS. 14-16. Other examples of adjusting current commands 1316 based on other characteristics that may vary quickly with respect to translational position and/or orientation of platform 810 (e.g., variations of one or more physical characteristics of a significant frequency, such as a broadband-level frequency) are also possible.

In some embodiments, current commands 1316 generated by FCC converter 1302 may be provided to force constant compensator 1304, which may adjust current commands 1316 based on at least one physical characteristic associated with the particular levitating platform 800 being controlled, resulting in updated current commands 1318. For example, the electrical resistance of one or more of first conductive coil 210 and second conductive coils 320 may vary with respect to the temperature of the coils 210, 320. Consequently, force constant compensator 1304 may adjust the desired electrical current indicated in current commands 1316 based on the present temperature of coils 210, 320 (e.g., by way of one or more temperature sensors) so that the desired forces and/or torques are applied to platform 810. Other physical characteristics associated with levitating platform 800, such as other coil-to-coil variations (e.g., static coil-to-coil variations, such as uneven coil wrapping or thickness, dynamic coil-to-coil variations other than those related to temperature, and so on), platform-to-platform variations, imperfections in modeling of levitating platform 800, and so on, may be adjusted individually using force constant compensator 1304. In some examples, the physical characteristics that affect the force constants associated with coils 210, 320 (e.g., the relationship between the amount of electrical current and the amount of resulting Lorentz force) may be determined during a testing phase of the manufacturing of levitating platform 800, during in situ operation of levitating platform 800, and/or at other times. Moreover, in some embodiments, such relationships between electrical current and force may be stored (e.g., in a lookup table or other data structure) so that force constant compensator 1304 may perform its compensation functions quickly.

Moreover, in some examples, force constant compensator 1304 may employ observer information 1312 in adjusting current commands 1316. For example, since the current position of platform 810 may affect which of second conductive coils 320 may be driven with electrical current, force constant compensator 1304 may employ particular force constants for each second conductive coil 320 that are to be currently driven. In some embodiments, force constant compensator 1304 may adjust current commands 1316 in light of characteristics that are either relatively static or slowly dynamic (e.g., in a narrowband frequency range) relative to the changes in the translational position and/or orientation of platform 810.

Updated current commands 1318 from force constant compensator 1304 may then be provided to coil driver controller 1306, which may generate multiple individual current commands 1320 for one or more of updated current commands 1318 received from force constant compensator 1304. For example, a single current command 1316 and corresponding updated current command 1318 may be associated with first conductive coil 210 of each coil subassembly 200. Additionally, a single current command 1316 and corresponding updated current command 1318 may be associated with all second conductive coils 320 of each coil subassembly 200. Consequently, in such embodiments, coil driver controller 1306 may generate one or more individual current commands 1320 for each first conductive coil 210 and second conductive coil 320 of levitating platform 800. Moreover, in some embodiments, coil driver controller 1306 may implement commutation of second conductive coils 320, as mentioned above, when generating individual current commands 1320 for second conductive coils 320 for each coil subassembly 200. In some examples, coil driver controller 1306 may employ observer information 1312 that is indicative of the relative location of each magnet subassembly 600 relative to its corresponding coil subassembly 200 to determine the proper commutative state of second conductive coils 320. More discussion regarding the operation of coil driver controller 1306 is provided below in conjunction with FIGS. 18-20.

Figure 14:
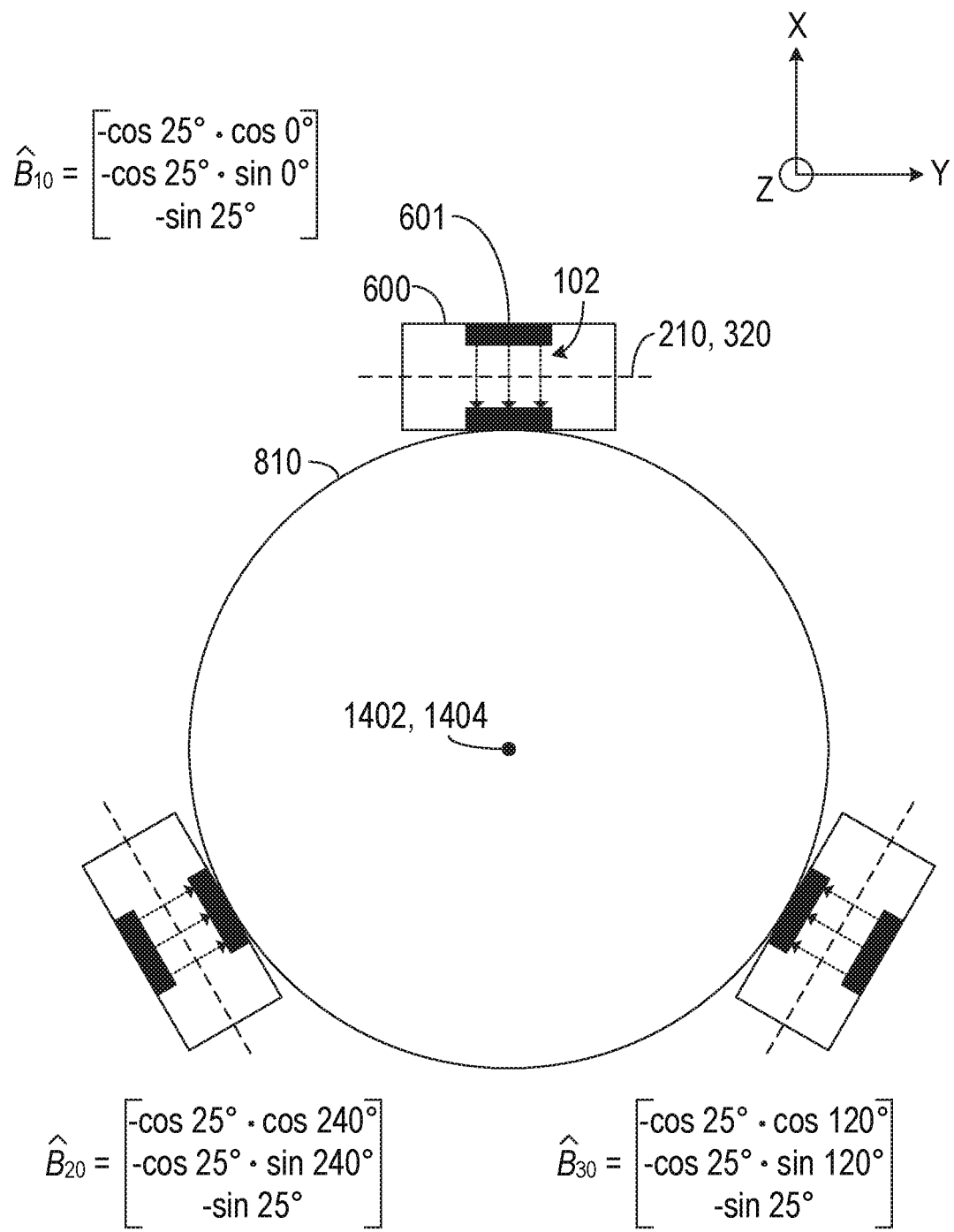
FIG. 14 is a graphical representation of a top view of an exemplary platform in a nominal position relative to an exemplary stator assembly.
Figure 15:
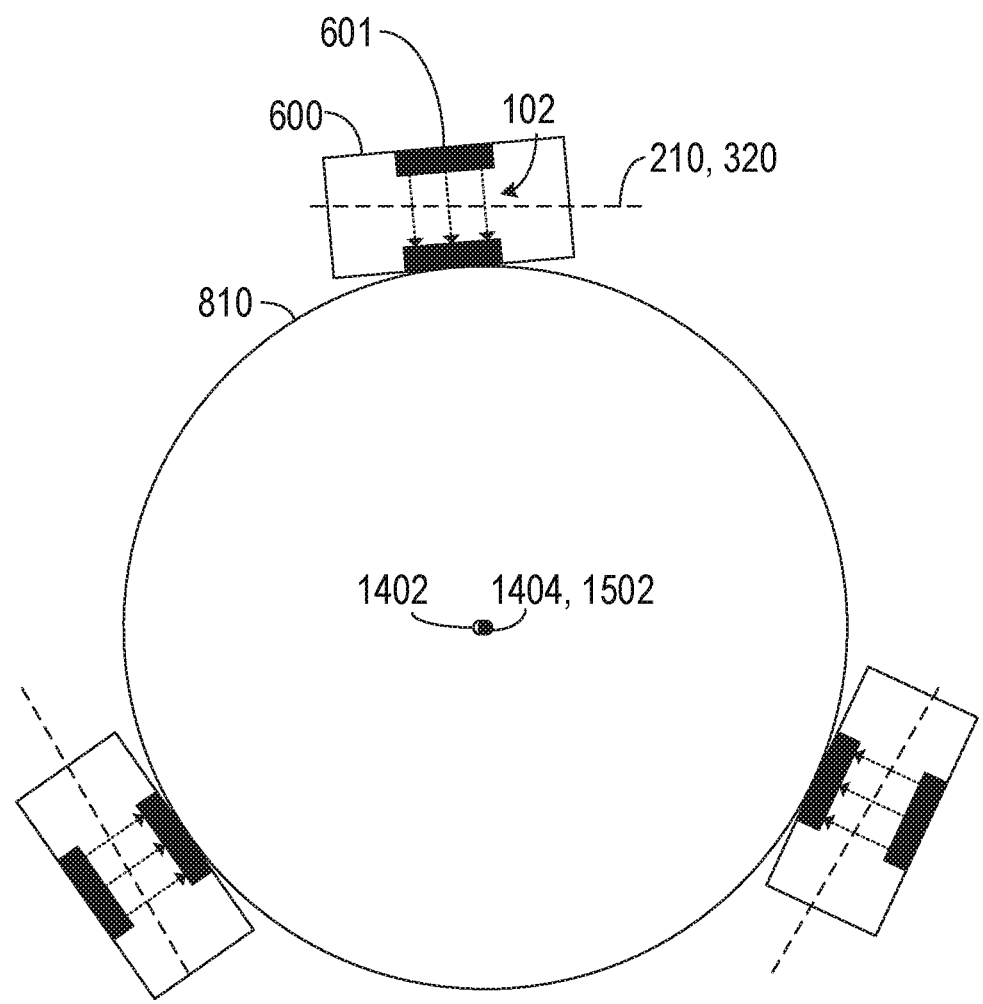
FIG. 15 is a graphical representation of a top view of the exemplary platform of FIG. 14 that has translated and rotated relative to the exemplary stator assembly.

FIGS. 14 and 15 are graphical representations of a top view of platform 810 in a nominal position and in a translated and rotated position, respectively. As depicted in FIG. 14, a center of mass 1404 of platform 810 is located at a central position 1402, and oriented at a nominal orientation, such that, in some implementations, each coil subassembly 200 and associated coils 210, 320 (as indicated by way of dashed lines) are nominally aligned between magnets 601 of corresponding magnet subassembly 600 (e.g., positioned halfway between, and aligned substantially parallel to, magnets 601). In some examples, such a position may be characterized by first conductive coil 210 of each coil subassembly 200 being horizontally centered between magnets 601 of a corresponding magnet subassembly 300 and by platform 810 being oriented parallel to a major plane (e.g., a top surface) defined by stator assembly 802.

In the example of FIG. 14, reference x-axis, y-axis, and z-axis for stator assembly 802 while in the nominal position are noted, with the x-axis being directed upward, the y-axis being directed to the right, and the z-axis being directed away from the reader. Within this reference frame, a nominal magnetic field imposed on coils 210, 320 of each coil subassembly 200 is represented in FIG. 14 by unit vectors $\hat{B}_{10}$, $\hat{B}_{20}$, and $\hat{B}_{30}$, respectively, each of which indicates the x-component, y-component, and z-component of each vector representing a nominal magnetic field. Accordingly, while the direction of magnetic field 102 for each of magnet subassembly 600 appears to lie predominantly in the x-y plane, unit vectors $\hat{B}_{10}$, $\hat{B}_{20}$, and $\hat{B}_{30}$ instead indicate that magnetic field 102 for each magnet subassembly 600 is directed upward 25 degrees from horizontal when platform 810 is in the nominal position. This orientation of magnet subassemblies 600 relative to platform 810 may be seen in FIGS. 8 and 9. However, in other embodiments, each magnet subassembly 600, as well as each coil subassembly 200, may be positioned or oriented differently from that shown in FIGS. 8, 9, and 14, resulting in different values for unit vectors $\hat{B}_{10}$, $\hat{B}_{20}$, and $\hat{B}_{30}$.

FIG. 15 depicts platform 810 in a translational position and angular orientation that are slightly different from the nominal position and orientation of FIG. 14. More specifically, center of mass 1404 of platform 810 has moved slightly from central position 1402 to translated position 1502, and platform 810 has rotated slightly counterclockwise. Such a change in position may have been necessitated by various factors, such as a change in attitude of a vehicle carrying levitating platform 800, a vibration of the vehicle, and so on. While FIG. 15 indicates that the depicted translation and rotation within the plane defined by platform 810 has occurred, platform 810 may also experience additional translation and/or rotation that includes some vertical component (e.g., outside the plane defined by platform 810 in its nominal position, as shown in FIG. 14).

Figure 16:
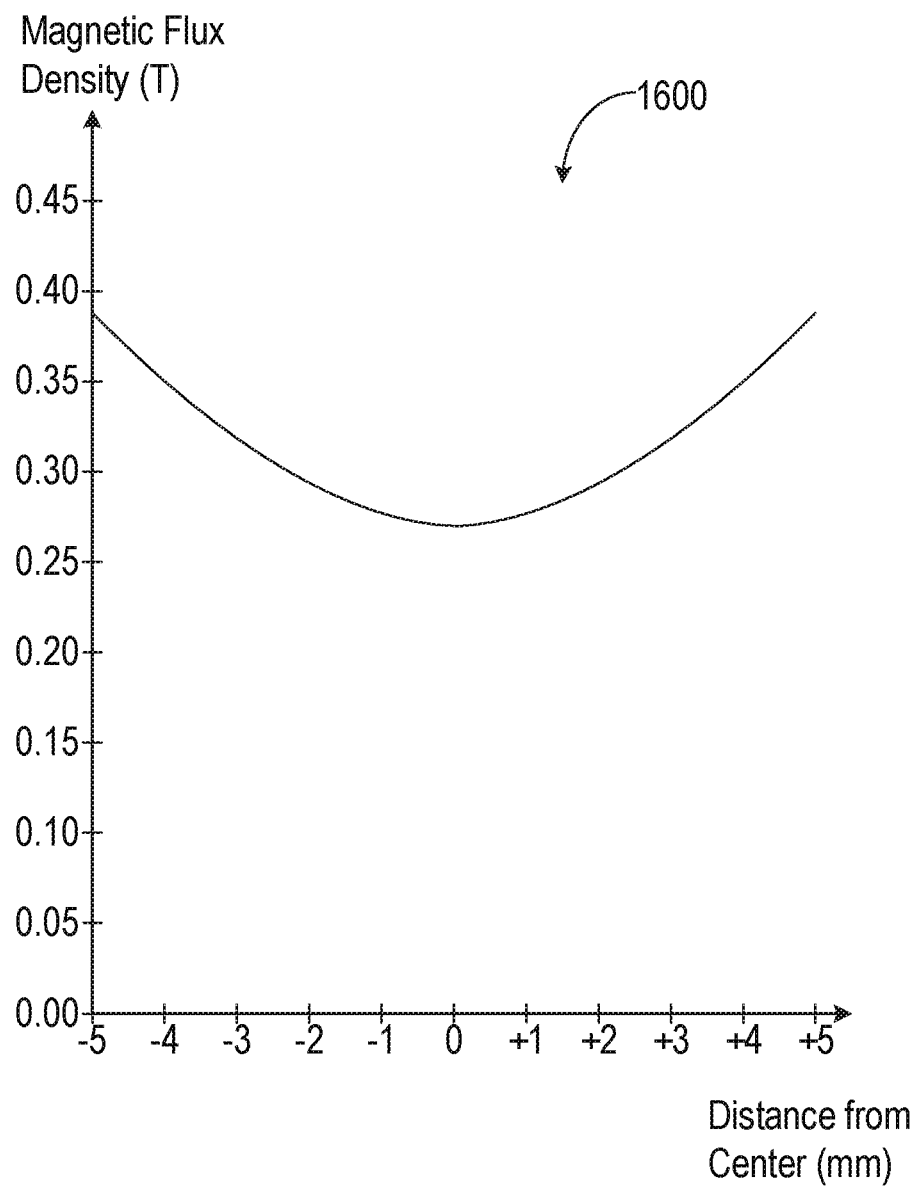
FIG. 16 is an exemplary graph of magnetic flux density versus distance from a center location between the magnets of the exemplary magnet subassembly of FIG. 6.

As a consequence of the movement of platform 810 illustrated in FIG. 15, the position of coils 210, 320 of each coil subassembly 200 may no longer be in a nominal position (e.g., centrally located between magnets 601 of corresponding magnet subassembly 600, and aligned orthogonal to magnetic field 102). In such examples, the magnitude of the magnetic flux density generated by magnets 601 that is experienced by coils 210, 320 may be altered, possibly resulting in an expected change in the amount of Lorentz force imposed on platform 810 via magnet subassemblies 600. FIG. 16 is a graph of a particular example of the magnitude of magnetic flux density 1600 relative to a distance from the midpoint along a line perpendicular to, and centered on, magnets 601 of magnet subassembly 600. As indicated, the minimum level of magnetic flux density 1600 at the midpoint may be approximately 0.27 tesla (T), with increasing distances away from the midpoint (e.g., toward one magnet 601 and away from corresponding magnet 601) corresponding to increases in magnetic flux density 1600, up to approximately 0.39 T. Accordingly, in this particular case, an increase in magnetic flux density of up to 40 percent may be experienced by a portion of coils 210, 320, thereby altering the amount of Lorentz force produced by applying the same amount of electrical current to coils 210, 320.

To address these variations, FCC converter 1302, to translate received force command 1314 into one or more current commands 1316, may take the present location (e.g., position and orientation) of platform 810 (e.g., relative to stator assembly 802) to determine the location of coils 210, 320 relative to corresponding magnets 601. The determined location may then be used to determine the amount of electrical current to be applied to coils 210, 320 in view of the magnitude (and possibly the direction) of the magnetic flux density interacting with coils 210, 320 to cause the amount of Lorentz force indicated in force command 1314.

Figure 17:
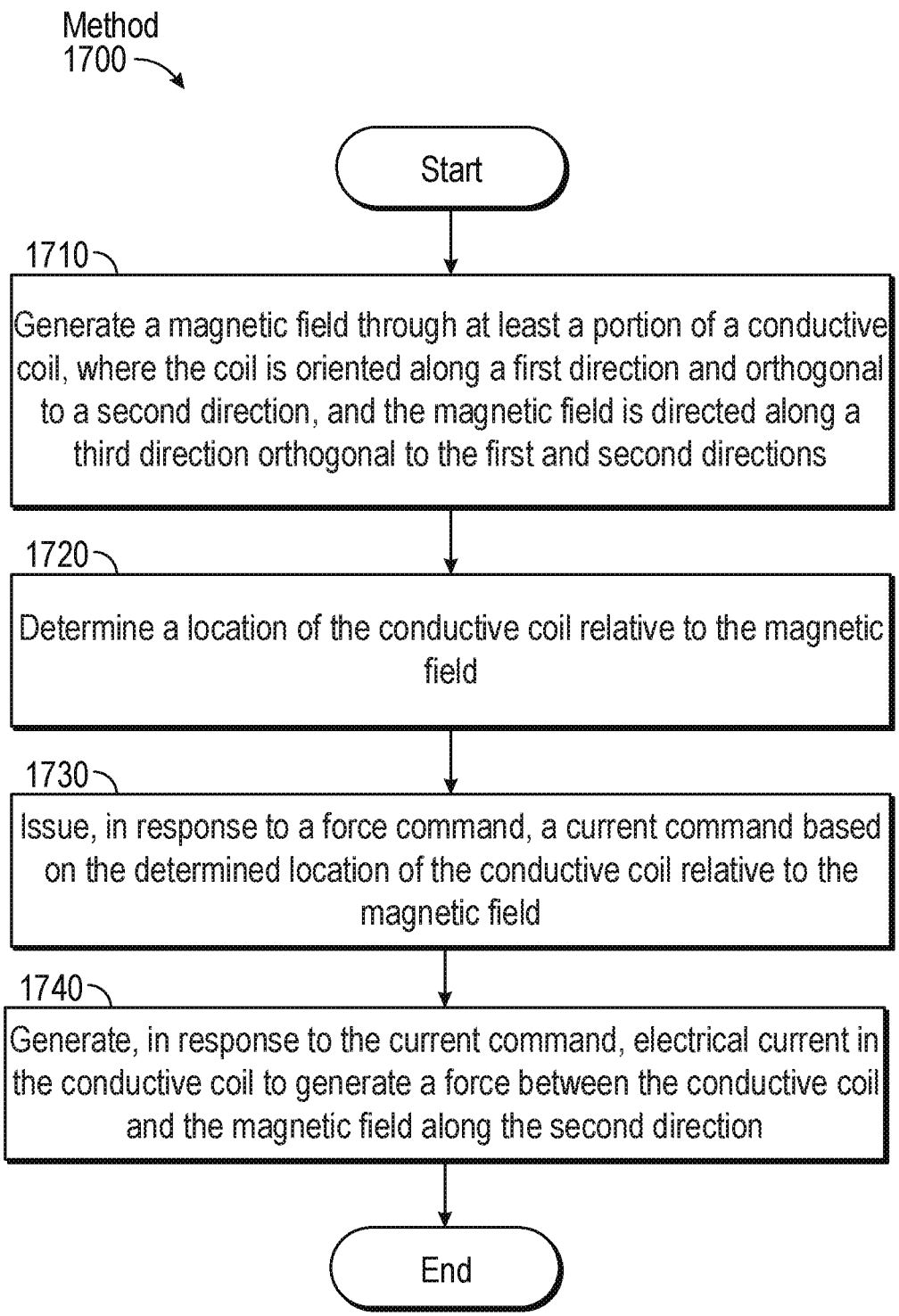
FIG. 17 is a flow diagram of an exemplary method of controlling a Lorentz-force-based apparatus.

FIG. 17 is a flow diagram of an exemplary method 1700 of controlling a Lorentz-force-based apparatus (e.g., levitating platform 800). In method 1700, at step 1710, a magnetic field (e.g., magnetic field 102) may be generated (e.g., by magnets 601) through at least a portion of a conductive coil (e.g., conductive coil 210 and/or 320), where the conductive coil is oriented along a first direction and orthogonal to a second direction, and the magnetic field is directed along a third direction orthogonal to the first and second directions, as discussed above. At step 1720, a location of the conductive coil relative to the magnetic field may be determined (e.g., by state observer 1204 and sensors/transducers 1016). At step 1730, in response to a force command (e.g., force command 1314), a current command (e.g., current command 1316) may be issued based on the determined location of the conductive coil relative to the magnetic field (e.g., by FCC converter 1302). At step 1740, in response to the current command, electrical current may be generated (e.g., by coil driver circuits 1014) in the conductive coil to generate a force (e.g., a Lorentz force) between the conductive coil and the magnetic field along the second direction. In some examples, force constant compensator 1304 and/or coil driver controller 1306 may further update or transform current command 1316, as discussed herein.

In some embodiments, the location and/or orientation of platform 810 relative to stator assembly 802 (and, hence, coils 210, 320 relative to magnets 601 and the magnetic field generated) may be employed in a number of ways to determine the amount of electrical current to be applied to coils 210, 320. As indicated above in relation to FIG. 16, a location of at least a portion of coil 210, 320 along the third direction between magnets 601 may be used to determine a corresponding magnitude of magnetic flux density intercepted by a portion of coil 210, 320. In some examples, FCC converter 1302 may presume that the magnetic flux density intercepted by a portion of coil 210, 320 is uniform across that portion, while in other embodiments, the angle of the portion of coil 210, 320 intercepting the magnetic field relative to the third direction, and/or the position of the portion of the coil 210, 320 along the first or second direction orthogonal to the third direction between magnets 601, may be considered in determining the total effect of the magnetic flux density intercepted by coil 210, 320. In other embodiments, other assumptions (e.g., the coil length and/or the number of turns of coil 210, 320 intercepting the magnetic flux density are near-uniform across the magnetic field) may be made in determining the total magnetic flux density impacting coil 210, 320.

Figure 18:
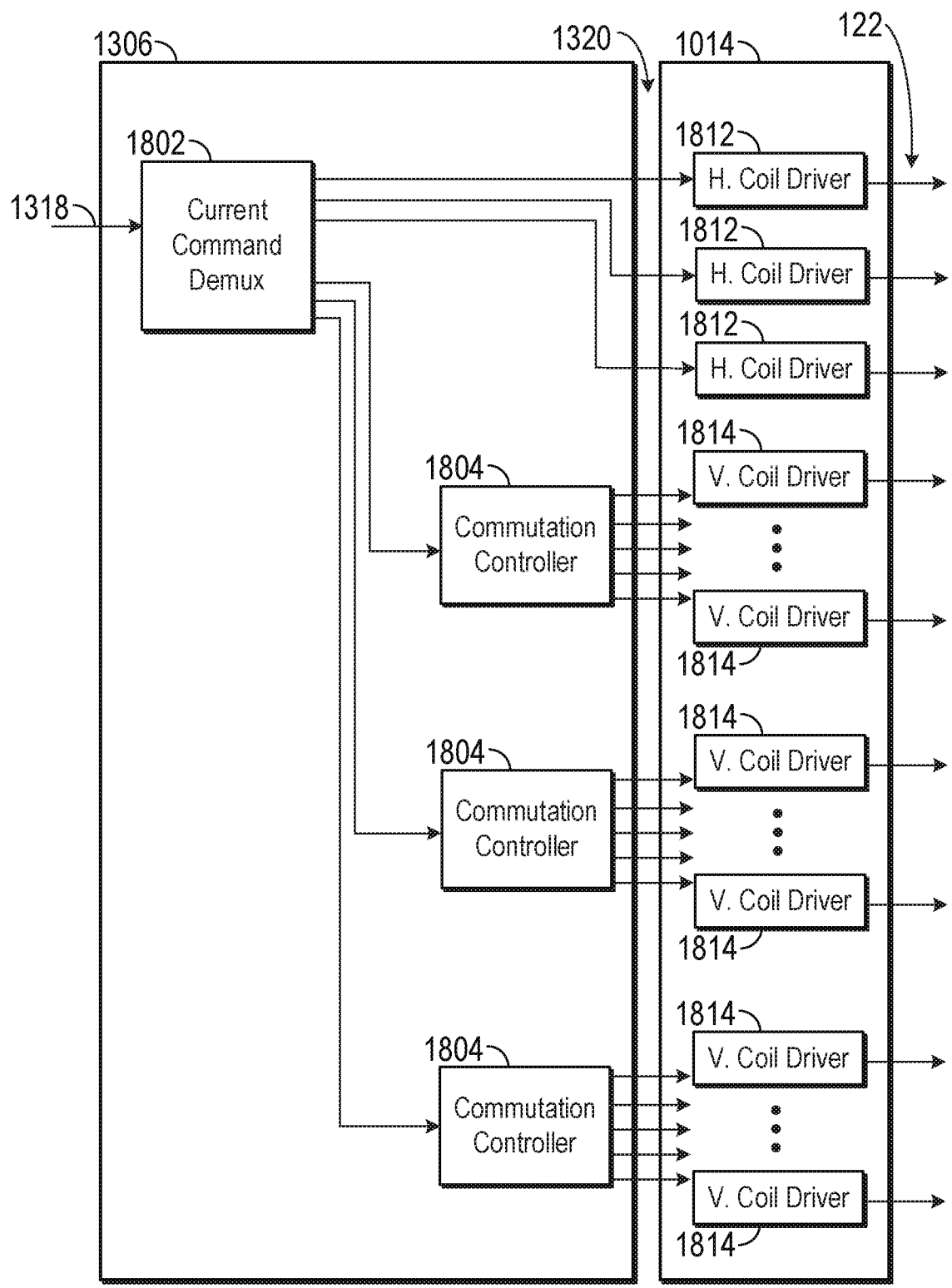
FIG. 18 is a block diagram of an exemplary coil driver controller employable in the force constant compensation and coil commutation block of FIG. 13.

As discussed above, FCC/CC block 1216 may also include coil driver controller 1306 that receives one or more updated current commands 1318 from force constant compensator 1304 and generates individual current commands for each coil 210, 320 of each coil subassembly 200. FIG. 18 is a block diagram of an embodiment of coil driver controller 1306 that may receive separate current commands: one for first conductive coil 210 of each coil subassembly 200, and one for the multiple second conductive coils 320 of each coil subassembly 200. In some examples, coil driver controller 1306 may include a current command demultiplexer 1802 and a plurality of commutation controllers 1804 (e.g., one per coil subassembly 200). Also, as indicated in FIG. 18, coil driver circuits 1014 of system 1000 may include a separate coil driver circuit for each coil 210, 320 of levitating platform 800, each of which may deliver electrical current to its corresponding coil 210, 320 in response to the individual current command 1320 it receives. In some examples, coil driver controller 1306 and coil driver circuits 1014 may be organized together as a coil driver subsystem.

In some examples, current command demultiplexer 1802 may receive a first current command and a second current command for each coil subassembly 200 (e.g., for a total of six current commands that may be implemented simultaneously or concurrently), and direct those current commands 1318 accordingly. In some embodiments, current command 1318 for each first conductive coil 210 for imparting horizontal movement (e.g., along the second direction) is directed to a corresponding horizontal coil driver 1812 as individual current command 1320, while current command 1318 for each set of second conductive coils 320 for imparting vertical movement (e.g., along the first direction) is first provided to commutation controller 1804 associated with the corresponding coil subassembly 200. Each commutation controller 1804 may then determine the appropriate amount of current to each of one or more second conductive coils 320 for its corresponding coil subassembly 200 based on the received current command 1318 and the present location and/or orientation of platform 810 relative to second conductive coils 320 (e.g., as indicated by observer information 1312 provided to coil driver controller 1306, as shown in FIG. 13). Commutation controller 1804 may then provide the appropriate individual current command 1320 indicating the determined amount of current for each second conductive coil 320 by way a corresponding vertical coil driver 1814. Consequently, as the magnet subassembly 60 moves vertically relative to second conductive coils 320 of each coil subassembly 200, commutation controller 1804 may provide the desired commutation for the second conductive coils 320. While the examples of FIG. 19 are particularly applicable to the embodiments of FIGS. 8 and 9, in which a single first conductive coil 210 and multiple second conductive coils 320 are employed in each coil subassembly 200, other embodiments in which single or multiple first conductive coils 210 and/or single or multiple second conductive coils 320 are used in a single coil subassembly 200 may be controlled by other embodiments of coil driver controller 1306 and coil driver circuits 1014 that provide corresponding numbers of commutation controllers 1804, horizontal coil drivers 1812, and vertical coil drivers 1814.

Figure 19:
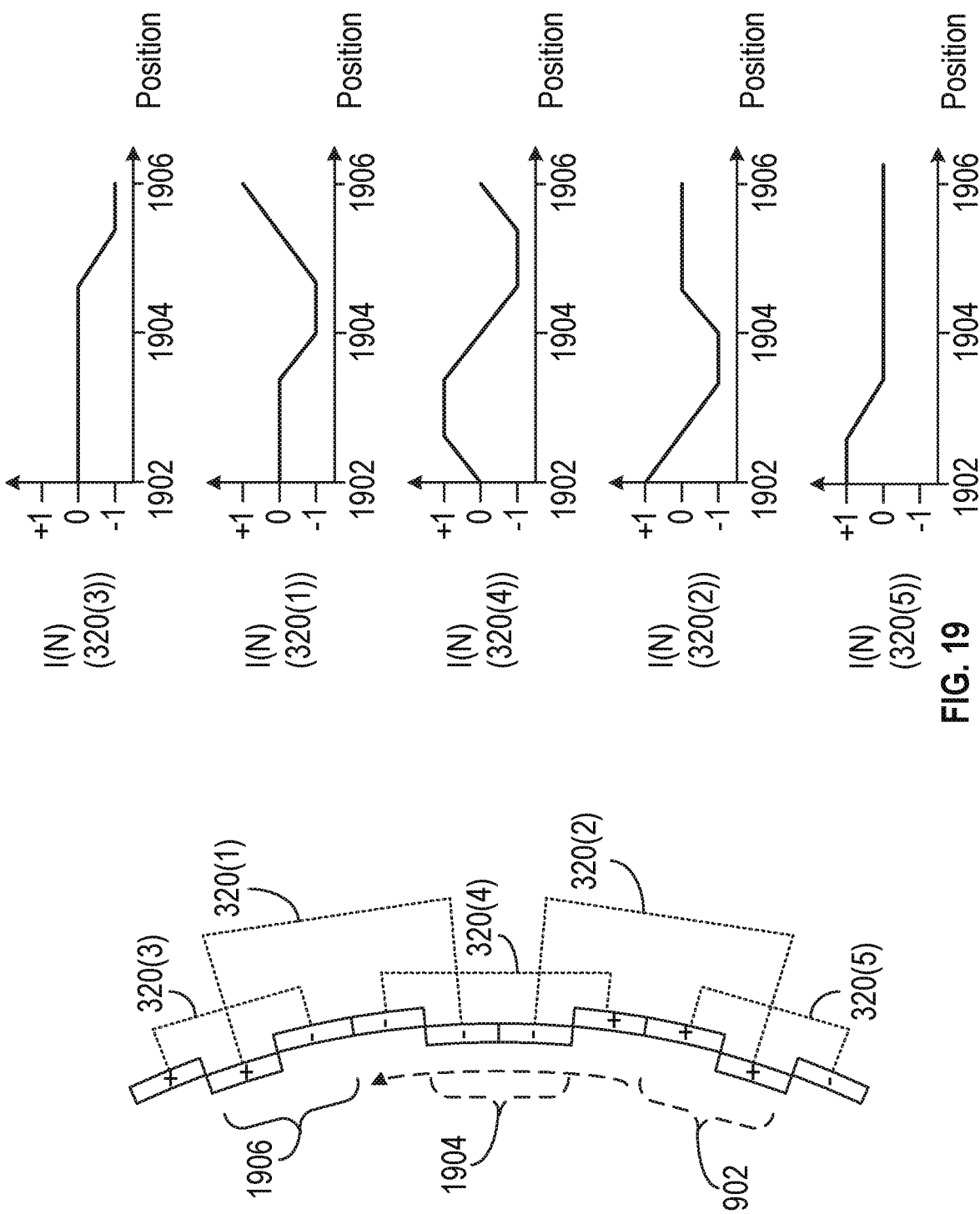
FIG. 19 is a cross-sectional view of coils of the exemplary coil subassembly of FIG. 2 and associated electrical current graphs of an exemplary control example employing the exemplary coil driver controller of FIG. 18.

FIG. 19 provides a cross-sectional view of second conductive coils 320(1)-320(5), along with a current graph for each second conductive coil 320(1)-320(5) associated with a particular control example 1900 (e.g., as performed by commutation controller 1804 for a particular coil subassembly 200). First conductive coil 210 is not depicted to simplify FIG. 19 and the related discussion hereafter. In control example 1900, magnet subassembly 600 (also not depicted in FIG. 19) is initially located at position 1902, and is moved upward through position 1904 to position 1906 by way of a Lorentz force by way of electrical current flowing in second conductive coils 320(1)-320(5). In some embodiments, magnets 601 of magnet subassembly 600 may be sized and positioned such that the magnetic field interacts at any particular time with current flowing through two-to-three of second conductive coils 320(1)-320(5) positioned between magnets 601 to produce the desired movement of magnet subassembly 600 relative to coil subassembly 200.

As depicted in FIG. 19, each half or branch of each second conductive coil 320(1)-320(5) is marked with an orientation (e.g., '+' or '−') to indicate that a positive electrical current, as indicated in the current graphs of FIG. 19 for each second conductive coil 320(1)-320(5), may flow outward (e.g., toward the reader) of the '+' branch and into (e.g., away from the reader) of the '−' branch of that second conductive coil 320(1)-320(5). Consequently, in the presence of a magnetic field generally directed from left to right through a second conductive coil 320(1)-320(5), as generated by magnets 601, a positive electrical current flowing in a second conductive coil 320(1)-320(5) may produce an upwardly-directed Lorentz force on magnet subassembly 600 when magnet subassembly 600 is positioned at the '+' branch of second conductive coil 320(1)-320(5), and may cause a downwardly-directed Lorentz force on magnet subassembly 600 when magnet subassembly 600 is positioned at the '−' branch of second conductive coil 320(1)-320(5). Accordingly, negative electrical current flowing in a second conductive coil 320(1)-320(5) will provide the opposite direction of Lorentz force on magnet subassembly 600 when magnet subassembly 600 is positioned at the corresponding branch of second conductive coil 320(1)-320(5). In some embodiments, such as those described herein, second conductive coils 320(1)-320(5) are positioned such that only one branch of any particular second conductive coil 320(1)-320(5) is located in the magnetic field produced between magnets 601 at any particular time such that electrical current flowing in any single second conductive coil 320(1)-320(5) does not apply opposing Lorentz forces on magnet subassembly 600 at any point in time. Also, in some embodiments, second conductive coils 320(1) and 320(2) may be wound in opposite directions (e.g., as indicated in FIG. 13), which may allow the use of a common interface to supply current to both of these second conductive coils 320(1) and 320(2).

Based on the foregoing, movement of magnet subassembly 600 from position 1902 through position 1904 to position 1906 by employing a substantially upward-directed Lorentz force may be accomplished, in some examples, by applying normalized electrical currents (I(N)) in each second conductive coil 320(1)-320(5), as illustrated in FIG. 19. More specifically, in some examples, as magnets 601 begin to encounter a '+' branch of a second conductive coil 302 (e.g., second conductive coil 302(4) when leaving position 1402), normalized electrical current I(N) may increase from zero toward one. Oppositely, as magnets 601 begin to leave a '+' branch of a second conductive coil (e.g., second conductive coil 320(2) when leaving position 1402), normalized electrical current I(N) may drop from one toward zero. Correspondingly, entering and leaving '−' branches of second conductive coils 302(1)-302(5), in some examples, may involve normalized currents I(N) transitioning between zero and negative one, as shown in the graphs. In some embodiments, a system (e.g., system 1000) may implement a control loop (e.g., control loop 1200) capable of coordinating the magnitude and polarity of the different electrical currents I(N) for each second conductive coil 320(1)-320(5) (e.g., as a form of commutation) to move magnet subassembly 600. Further, in some examples, the position of multiple such magnet subassemblies 600, as well as attached platform 810, may be altered and/or maintained (e.g., for levitation control) in response to such electrical currents in corresponding second conductive coils 320(1)-320(5) (as well as electrical currents in first conductive coils 210). While normalized currents I(N) are depicted in FIG. 19 as exhibiting a trapezoidal commutation profile, other types of commutation profiles (e.g., sinusoidal) are also possible.

As mentioned above, coil driver controller 1306, and more specifically commutation controller 1804, may employ observer information 1312 to determine the current commutation state, in some embodiments. For example, commutation controller 1804 may use observer information 1312 to determine the relative position of platform 810 relative to second conductive coils 320(1)-320(5) (e.g., the position of magnet subassembly 600 from position 1902 through position 1904 to position 1906) to determine, at least in part, the amount of current to apply, if any, to each of second conductive coils 320(1)-320(5). Also, in some examples, commutation controller 1804 may use that same information to determine the position of one or more of second conductive coils 320(1)-320(5) between magnets 601 by taking into account the relative difference in those positions among second conductive coils 320(1)-320(5), as shown in FIG. 19 (e.g., because second conductive coils 320(1) and 320(2) may reside opposite separator 310 from second conductive coils 320(3)-320(5), as shown in FIG. 4, thus incurring different displacements between magnets 601).

Figure 20:
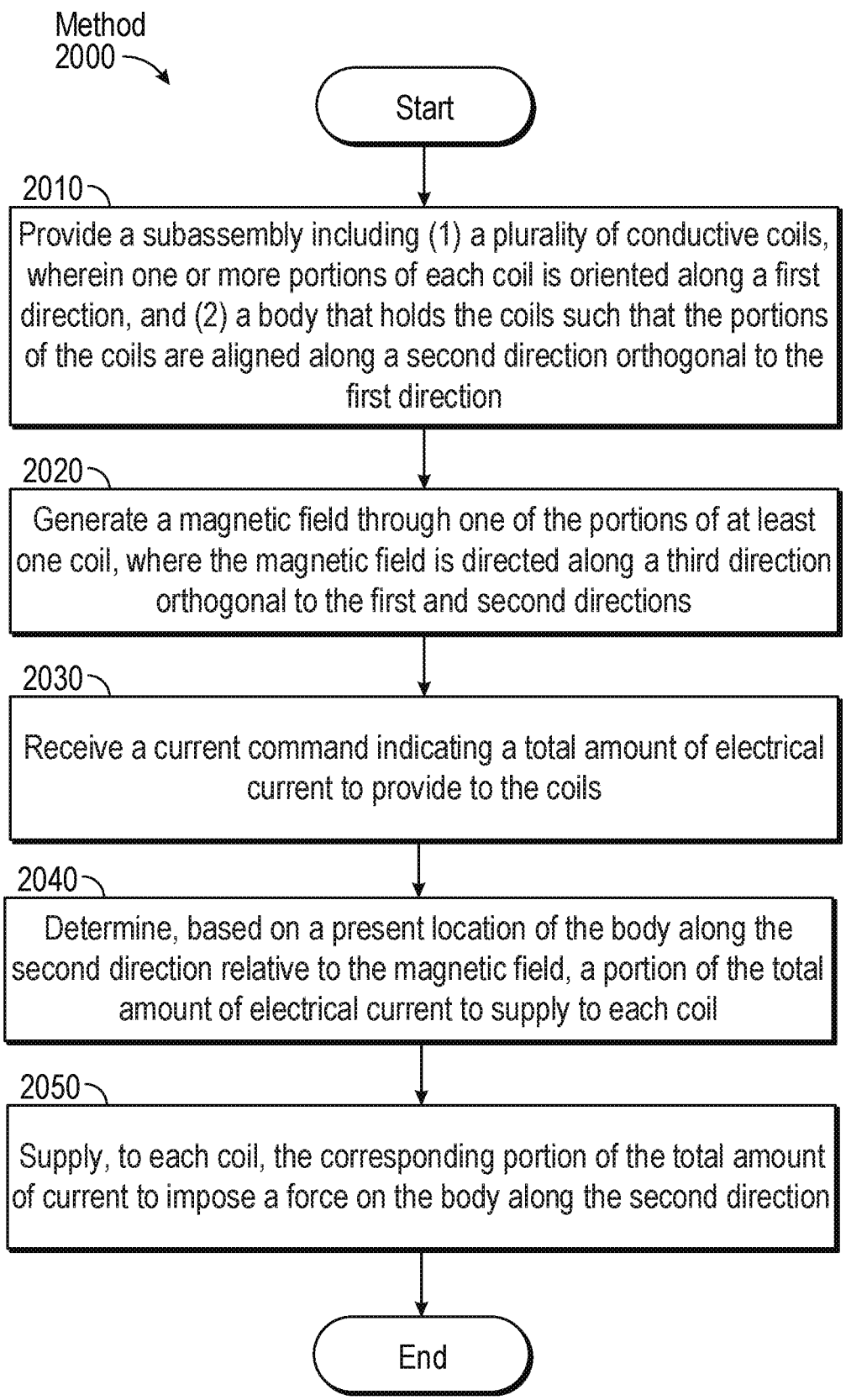
FIG. 20 is a flow diagram of another exemplary method of controlling a Lorentz-force-based apparatus.

FIG. 20 is a flow diagram of an exemplary method 2000 of controlling a Lorentz-force-based apparatus (e.g., levitating platform 800), such as by commutation of a plurality of conductive coils (e.g., second conductive coils 320 of a coil subassembly 200). In method 2000, at step 2010, a subassembly (e.g., coil subassembly 200) is provided that includes a plurality of conductive coils (e.g., second conductive coils 320), one or more portions of which are oriented along a first direction. The subassembly may also include a body that holds the plurality of conductive coils such that the portions of the coils are aligned along a second direction orthogonal to the first direction. At step 2020, a magnetic field (e.g., magnetic field 102) may be generated (e.g., by magnets 601 of magnet subassembly 600) through one of the portions of at least one of the plurality of conductive coils, where the magnetic field is directed along a third direction orthogonal to the first and second directions.

At step 2030, in some embodiments a current command (e.g., current command (e.g., current command 1318) may be received (e.g., by commutation controller 1804) indicating a total amount of electrical current to provide to the plurality of conductive coils. At step 2040, in some examples, based on a present location of the body along the second direction relative to the magnetic field (e.g., as determined by state observer 1204 using sensors/transducers 1016), a portion of the total amount of electrical current to supply to each of the plurality of conductive coils may be determined (e.g., by commutation controller 1804). At step 2050, the corresponding portion of the total amount of current may be supplied to each of the plurality of conductive coils (e.g., by vertical coil drivers 1814) to impose a force (e.g., a Lorentz force) on the body along the second direction (e.g., thus causing movement in connected platform 810 of levitating platform 800).

As explained above in conjunction with FIGS. 1 through 20, the coil and magnet subassemblies described herein, as well as the systems and methods employing such subassemblies, may facilitate movement of a platform carrying a device or system, such as an optical communication system that is sensitive to perturbing motions (e.g., mechanical vibrations) normally present in the environment (e.g., a space vehicle) in which the device or system operates. Such movement may be primarily rotational in nature (e.g., providing two degrees of freedom, such as about pitch and yaw axes), or may be both translational and rotational (e.g., providing up to six degrees of freedom). Additionally, such systems and methods may provide exceptional accuracy (e.g., in terms of nanoradians and/or microns) while simultaneously facilitating large overall ranges of motion (e.g., over several degrees of rotation or centimeters of translation). Moreover, such systems may be implemented in a variety of environments (e.g., varying orbital and/or terrestrial vehicles) for numerous different types of payloads. Furthermore, use of various embodiments described herein may eliminate a need for some hardware (e.g., a large mirror for directing an optical beam in a desired direction) employed in current operational environments.

EXAMPLE EMBODIMENTS

Example 1: A system may include (1) a conductive coil, wherein at least a portion of the conductive coil is oriented along a first direction and orthogonal to a second direction, (2) a magnetic field generation structure that generates a magnetic field through the portion of the conductive coil along a third direction orthogonal to the first direction and the second direction, (3) a force constant compensator that (a) receives an electrical current command to alter a relative location of the conductive coil and the magnetic field and (b) adjusts the electrical current command based on at least one physical characteristic of the system that affects a relationship between electrical current in the conductive coil and resulting force between the conductive coil and the magnetic field along the second direction, and (4) a coil driver circuit that generates, in response to the adjusted electrical current command, a first electrical current in the conductive coil to generate a first force between the conductive coil and the magnetic field along the second direction.

Example 2: The system of Example 1, the at least one physical characteristic of the system may include at least one physical characteristic of the conductive coil.

Example 3: The system of Example 2, where the at least one physical characteristic of the conductive coil may include a dynamic physical characteristic of the conductive coil.

Example 4: The system of Example 3, where (1) the dynamic physical characteristic of the conductive coil may include an electrical resistance of the conductive coil relative to a temperature of the conductive coil, (2) the system may further include a temperature sensor that provides a temperature reading, and (3) the force constant compensator may adjust the electrical current command based on the temperature reading.

Example 5: The system of Example 1, where the at least one physical characteristic of the conductive coil may include a static physical characteristic of the conductive coil.

Example 6: The system of Example 5, where the system may further include a memory storing a data structure specifying the relationship between electrical current in the conductive coil and resulting force between the conductive coil and the magnetic field along the second direction.

Example 7: The system of any one of Examples 1-6, where the portion of the conductive coil may define a portion of a spherical surface.

Example 8: The system of any one of Examples 1-6, wherein the magnetic field generation structure may include a pair of magnets positioned on opposing sides of the portion of the conductive coil along the third direction.

Example 9: The system of any one of Examples 1-6, where (1) the conductive coil may include a first conductive coil, (2) the system may further include (a) a second conductive coil, where at least a portion of the second conductive coil is oriented along the second direction within the magnetic field and (b) a body that holds the first conductive coil and the second conductive coil, (3) the electrical current command may include a first electrical current command, (4) the force constant compensator (a) may receive a second electrical current command to alter a relative location of the second conductive coil and the magnetic field and (b) may adjust the second electrical current command based on at least one physical characteristic of the system that affects a relationship between electrical current in the second conductive coil and resulting force between the second conductive coil and the magnetic field along the first direction, and (4) the coil driver may generate, in response to the adjusted second electrical current command, electrical current in the second conductive coil to generate a second force between the second conductive coil and the magnetic field along the first direction.

Example 10: The system of Example 9, where the system may further include (1) a detection subsystem that determines a location of the first conductive coil relative to the magnetic field and a location of the second conductive coil relative to the magnetic field and (2) a force-to-current converter that (a) receives a first force command to alter a relative location of the first conductive coil and the magnetic field, (b) receives a second force command to alter a relative location of the second conductive coil and the magnetic field, (c) issues, in response to the first force command, the first electrical current command based on the determined location of the first conductive coil relative to the magnetic field, and (d) issues, in response to the second force command, the second electrical current command based on the determined location of the second conductive coil relative to the magnetic field.

Example 11: The system of Example 10, where the detection subsystem may determine the location of the first conductive coil relative to the magnetic field and the location of the second conductive coil relative to the magnetic field by determining a location of a first mechanical structure connected to the magnetic field generation structure relative to a location of a second mechanical structure connected to the body.

Example 12: The system of Example 11, where (1) the system may further include a plurality of distance sensors, (2) each distance sensor may measure a distance between the distance sensor and at least one of the first mechanical structure and the second mechanical structure, and (3) the detection subsystem may determine the location of the first conductive coil relative to the magnetic field and the location of the second conductive coil relative to the magnetic field based on the measured distances.

Example 13: The system of Example 12, where the detection may generate (1) a first translational position vector and a first rotational position vector indicating the location of the first conductive coil relative to the magnetic field based on the measured distances and (2) a second translational position vector and a second rotational position vector indicating the location of the second conductive coil relative to the magnetic field based on the measured distances.

Example 14: The system of Example 13, where (1) the first force command may include a first translational force vector and a first rotational torque vector, (2) the second force command may include a second translational force vector and a second rotational torque vector, (3) the first electrical current command may be based on the first translational position vector, the first rotational position vector, the first translational force vector, and the first rotational torque vector, and (4) the second electrical current command may be based on the second translational position vector, the second rotational position vector, the second translational force vector, and the second rotational torque vector.

Example 15: The system of Example 14, where the system may further include (1) a platform mechanically coupled to one of the body and the magnetic field generation structure and (2) a tracking controller that generates the first force command and the second force command based on an indication of a present orientation of the platform relative to a desired orientation of the platform.

Example 16: The system of Example 15, where (1) the system may further include a directional sensor that senses the present orientation of the platform and (2) the detection subsystem may generate, based on the sensed present orientation of the platform, the indication of the present orientation of the platform relative to the desired orientation of the platform.

Example 17: The system of Example 15, where the force-to-current converter may also generate the first electrical current command and the second electrical current command based on the indication of the present orientation of the platform relative to the desired orientation of the platform.

Example 18: A method may include (1) generating a magnetic field through at least a portion of a conductive coil, where (a) the conductive coil is oriented along a first direction and orthogonal to a second direction and (b) the magnetic field is directed along a third direction orthogonal to the first direction and the second direction, (2) receiving an electrical current command to alter a relative location of the conductive coil and the magnetic field, (3) adjusting the electrical current command based on at least one physical characteristic of a system including the conductive coil that affects a relationship between electrical current in the conductive coil and resulting force between the conductive coil and the magnetic field along the second direction, and (4) generating, in response to the adjusted electrical current command, a first electrical current in the conductive coil to generate a first force between the conductive coil and the magnetic field along the second direction.

Example 19: The method of Example 18, where the at least one physical characteristic of the system may include at least one physical characteristic of the conductive coil.

Example 20: A system may include (1) a plurality of subassemblies, where each subassembly includes a conductive coil, where at least a portion of the conductive coil is oriented along a first direction and orthogonal to a second direction, (2) for each subassembly, a magnetic field generation structure that generates a magnetic field through the portion of the conductive coil, where the magnetic field is directed along a third direction orthogonal to the first direction and the second direction, (3) a stator assembly including a base and (a) the plurality of subassemblies, where each of the plurality of subassemblies is connected to the base or (b) the magnetic field generation structures, where each of the magnetic field generation structures is connected to the base, (4) a rotor assembly including a platform and (a) the plurality of subassemblies, where each of the plurality of subassemblies is connected to the platform or (b) the magnetic field generation structures, where each of the magnetic field generation structures is connected to the platform, (5) a force constant compensator that, for each subassembly, (a) receives an electrical current command to alter a location of the rotor assembly relative to the stator assembly and (b) adjusts the electrical current command based on at least one physical characteristic of the system that affects a relationship between electrical current in the conductive coil and resulting force between the conductive coil and the magnetic field along the second direction, and (6) a coil driver that, for each subassembly, (a) supplies, in response to the adjusted electrical current command, first electrical current to the conductive coil to move a corresponding magnetic field generation structure along the second direction relative to the subassembly or (b) supplies, in response to the adjusted electrical current command, first electrical current to the conductive coil to move the subassembly along the second direction relative to a corresponding magnetic field generation structure.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive sensor and/or transducer data to be transformed, transform the sensor and/or transducer data, and output a result of the transformation to operate a levitating platform (e.g., rotate and/or translate a payload coupled to the levitating platform), as discussed in detail above. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system comprising:
a conductive coil, wherein at least a portion of the conductive coil is oriented along a first direction and orthogonal to a second direction;
a magnetic field generation structure that generates a magnetic field through the portion of the conductive coil along a third direction orthogonal to the first direction and the second direction;
a force constant compensator that:
receives an electrical current command to alter a relative location of the conductive coil and the magnetic field; and
adjusts the electrical current command based on at least one physical characteristic of the system that affects a relationship between electrical current in the conductive coil and resulting force between the conductive coil and the magnetic field along the second direction; and
a coil driver that generates, in response to the adjusted electrical current command, a first electrical current in the conductive coil to generate a first force between the conductive coil and the magnetic field along the second direction.

2. The system of claim 1, wherein the at least one physical characteristic of the system comprises at least one physical characteristic of the conductive coil.

3. The system of claim 2, wherein the at least one physical characteristic of the conductive coil comprises a dynamic physical characteristic of the conductive coil.

4. The system of claim 3, wherein:
the dynamic physical characteristic of the conductive coil comprises an electrical resistance of the conductive coil relative to a temperature of the conductive coil;
the system further comprises a temperature sensor that provides a temperature reading; and
the force constant compensator adjusts the electrical current command based on the temperature reading.

5. The system of claim 1, wherein the at least one physical characteristic of the conductive coil comprises a static physical characteristic of the conductive coil.

6. The system of claim 5, wherein the system further comprises a memory storing a data structure specifying the relationship between electrical current in the conductive coil and resulting force between the conductive coil and the magnetic field along the second direction.

7. The system of claim 1, wherein the portion of the conductive coil defines a portion of a spherical surface.

8. The system of claim 1, wherein the magnetic field generation structure comprises a pair of magnets positioned on opposing sides of the portion of the conductive coil along the third direction.

9. The system of claim 1, wherein:
the conductive coil comprises a first conductive coil;
the system further comprises:
a second conductive coil, wherein at least a portion of the second conductive coil is oriented along the second direction within the magnetic field; and
a body that holds the first conductive coil and the second conductive coil;
the electrical current command comprises a first electrical current command;
the force constant compensator:
receives a second electrical current command to alter a relative location of the second conductive coil and the magnetic field; and
adjusts the second electrical current command based on at least one physical characteristic of the system that affects a relationship between electrical current in the second conductive coil and resulting force between the second conductive coil and the magnetic field along the first direction; and
the coil driver generates, in response to the adjusted second electrical current command, electrical current in the second conductive coil to generate a second force between the second conductive coil and the magnetic field along the first direction.

10. The system of claim 9, further comprising:
a detection subsystem that determines a location of the first conductive coil relative to the magnetic field and a location of the second conductive coil relative to the magnetic field; and
a force-to-current converter that:
receives a first force command to alter a relative location of the first conductive coil and the magnetic field;
receives a second force command to alter a relative location of the second conductive coil and the magnetic field;
issues, in response to the first force command, the first electrical current command based on the determined location of the first conductive coil relative to the magnetic field; and
issues, in response to the second force command, the second electrical current command based on the determined location of the second conductive coil relative to the magnetic field.

11. The system of claim 10, wherein the detection subsystem determines the location of the first conductive coil relative to the magnetic field and the location of the second conductive coil relative to the magnetic field by determining a location of a first mechanical structure connected to the magnetic field generation structure relative to a location of a second mechanical structure connected to the body.

12. The system of claim 11, wherein:
the system further comprises a plurality of distance sensors;
each distance sensor measures a distance between the distance sensor and at least one of the first mechanical structure and the second mechanical structure; and
the detection subsystem determines the location of the first conductive coil relative to the magnetic field and the location of the second conductive coil relative to the magnetic field based on the measured distances.

13. The system of claim 12, wherein the detection subsystem generates:
a first translational position vector and a first rotational position vector indicating the location of the first conductive coil relative to the magnetic field based on the measured distances; and
a second translational position vector and a second rotational position vector indicating the location of the second conductive coil relative to the magnetic field based on the measured distances.

14. The system of claim 13, wherein:
the first force command comprises a first translational force vector and a first rotational torque vector;
the second force command comprises a second translational force vector and a second rotational torque vector;
the first electrical current command is based on the first translational position vector, the first rotational position vector, the first translational force vector, and the first rotational torque vector; and
the second electrical current command is based on the second translational position vector, the second rotational position vector, the second translational force vector, and the second rotational torque vector.

15. The system of claim 14, further comprising:
a platform mechanically coupled to one of the body and the magnetic field generation structure; and
a tracking controller that generates the first force command and the second force command based on an indication of a present orientation of the platform relative to a desired orientation of the platform.

16. The system of claim 15, wherein:
the system further comprises a directional sensor that senses the present orientation of the platform; and
the detection subsystem generates, based on the sensed present orientation of the platform, the indication of the present orientation of the platform relative to the desired orientation of the platform.

17. The system of claim 15, wherein the force-to-current converter also generates the first electrical current command and the second electrical current command based on the indication of the present orientation of the platform relative to the desired orientation of the platform.

18. A method comprising:
generating a magnetic field through at least a portion of a conductive coil, wherein:
the conductive coil is oriented along a first direction and orthogonal to a second direction; and
the magnetic field is directed along a third direction orthogonal to the first direction and the second direction;
receiving an electrical current command to alter a relative location of the conductive coil and the magnetic field;
adjusting the electrical current command based on at least one physical characteristic of a system including the conductive coil that affects a relationship between electrical current in the conductive coil and resulting force between the conductive coil and the magnetic field along the second direction; and
generating, in response to the adjusted electrical current command, a first electrical current in the conductive coil to generate a first force between the conductive coil and the magnetic field along the second direction.

19. The method of claim 18, wherein the at least one physical characteristic of the system comprises at least one physical characteristic of the conductive coil.

20. A system comprising:
a plurality of subassemblies, wherein each subassembly comprises a conductive coil, wherein at least a portion of the conductive coil is oriented along a first direction and orthogonal to a second direction; and
for each subassembly, a magnetic field generation structure that generates a magnetic field through the portion of the conductive coil, wherein the magnetic field is directed along a third direction orthogonal to the first direction and the second direction;
a stator assembly comprising a base and:
the plurality of subassemblies, wherein each of the plurality of subassemblies is connected to the base; or
the magnetic field generation structures, wherein each of the magnetic field generation structures is connected to the base;
a rotor assembly comprising a platform and:
the plurality of subassemblies, wherein each of the plurality of subassemblies is connected to the platform; or
the magnetic field generation structures, wherein each of the magnetic field generation structures is connected to the platform;
a force constant compensator that, for each subassembly:
receives an electrical current command to alter a location of the rotor assembly relative to the stator assembly; and
adjusts the electrical current command based on at least one physical characteristic of the system that affects a relationship between electrical current in the conductive coil and resulting force between the conductive coil and the magnetic field along the second direction; and
a coil driver that, for each subassembly:
supplies, in response to the adjusted electrical current command, first electrical current to the conductive coil to move a corresponding magnetic field generation structure along the second direction relative to the subassembly; or
supplies, in response to the adjusted electrical current command, first electrical current to the conductive coil to move the subassembly along the second direction relative to a corresponding magnetic field generation structure.

* * * * *